(12) United States Patent
Tanaka et al.

(10) Patent No.: US 8,243,776 B2
(45) Date of Patent: Aug. 14, 2012

(54) COMMUNICATION DEVICE, NOISE REMOVING METHOD, AND PROGRAM

(75) Inventors: Katsuyuki Tanaka, Kanagawa (JP); Hideki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 658 days.

(21) Appl. No.: 12/392,596

(22) Filed: Feb. 25, 2009

(65) Prior Publication Data

US 2009/0257471 A1 Oct. 15, 2009

(30) Foreign Application Priority Data

Feb. 26, 2008 (JP) ................................ P2008-044496

(51) Int. Cl.
*H04B 1/00* (2006.01)

(52) U.S. Cl. ........ 375/148; 375/130; 375/144; 375/346; 375/350; 455/63.1; 455/67.13; 455/114.2; 455/296; 455/501; 370/335; 370/342; 329/349; 329/353; 327/551

(58) Field of Classification Search .................. 375/130, 375/144, 148, 346, 350; 455/63.1, 67.13, 455/114.2, 296, 501; 370/335, 342; 329/349, 329/353; 327/551
See application file for complete search history.

(56) References Cited

U.S. PATENT DOCUMENTS

| | | | |
|---|---|---|---|
| 6,407,689 B1 | 6/2002 | Bazarjani et al. | |
| 2005/0047486 A1 | 3/2005 | Sakaue et al. | |
| 2006/0029142 A1 | 2/2006 | Arad | |
| 2008/0125154 A1 | 5/2008 | Zirwas et al. | |
| 2008/0205555 A1 | 8/2008 | Zhu et al. | |

FOREIGN PATENT DOCUMENTS

| | | |
|---|---|---|
| JP | 05-075573 | 3/1993 |
| JP | 05-308344 | 11/1993 |
| JP | 09-326713 | 12/1997 |
| JP | 2000-049753 | 2/2000 |
| JP | 2000-101479 | 4/2000 |
| JP | 2000-236360 | 8/2000 |
| JP | 2000-307476 | 11/2000 |
| JP | 2001-53717 | 2/2001 |
| JP | 2002-374179 | 12/2002 |
| JP | 2003-232844 | 8/2003 |
| JP | 2004-529518 | 9/2004 |
| JP | 2005-080272 | 3/2005 |
| JP | 2005-260860 | 9/2005 |
| JP | 2008-527883 | 7/2008 |

(Continued)

OTHER PUBLICATIONS

European Search Report for EP 09 25 0409 dated Jun. 17, 2009.

(Continued)

*Primary Examiner* — Leon Flores
(74) *Attorney, Agent, or Firm* — Finnegan, Henderson, Farabow, Garrett & Dunner, L.L.P.

(57) ABSTRACT

A communication device according to an embodiment of the present invention includes a communication antenna that receives a transmission signal where a spectrum spread signal subjected to a spectrum spread is modulated; an intermediate frequency converting unit that converts the transmission signal received by the communication antenna into an intermediate frequency signal having a predetermined frequency; an analog to digital converting unit that discretizes the intermediate frequency signal and outputs a discretization signal; a noise removing unit that detects a noise other than a normal thermal noise included in the discretization signal and removes the detected noise from the discretization signal; and a demodulating unit that demodulates the spectrum spread signal, based on the discretization signal that is output from the noise removing unit.

10 Claims, 25 Drawing Sheets

FOREIGN PATENT DOCUMENTS

| | | |
|---|---|---|
| JP | 2008-543141 | 11/2008 |
| WO | WO 01/77705 A2 | 10/2001 |
| WO | WO 02-37686 | 5/2002 |
| WO | WO 2007-059517 | 5/2007 |
| WO | WO 2007/136056 A1 | 11/2007 |

OTHER PUBLICATIONS

Daniele Borio et al., "Analysis of the One-Pole Notch Filter for Interference Mitigation: Wiener Solution and Loss Estimations", ION GNSS 19$^{th}$ International Technical Meeting of the Satellite Division, Sep. 26-29, 2006, Fort Worth, Texas.

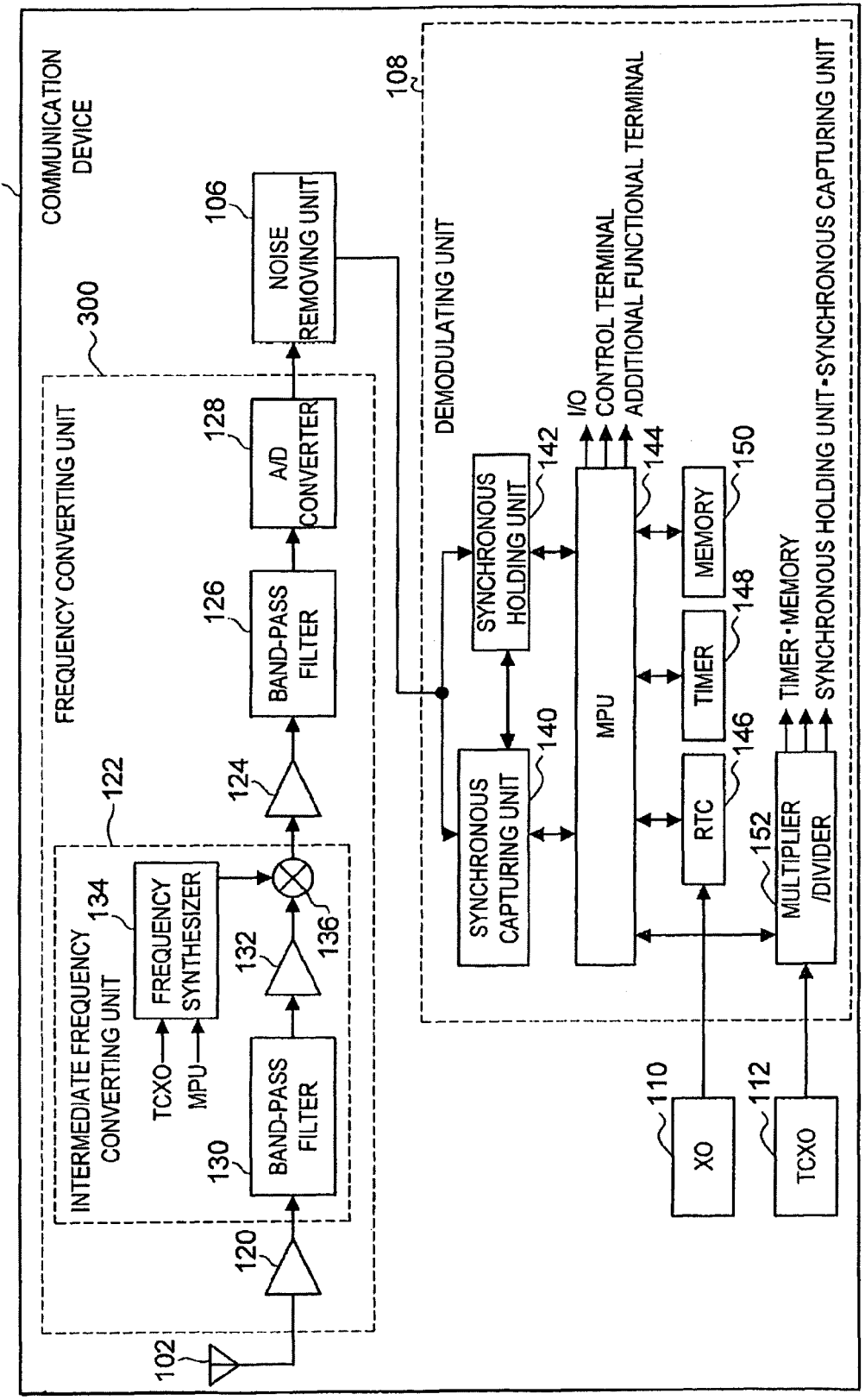

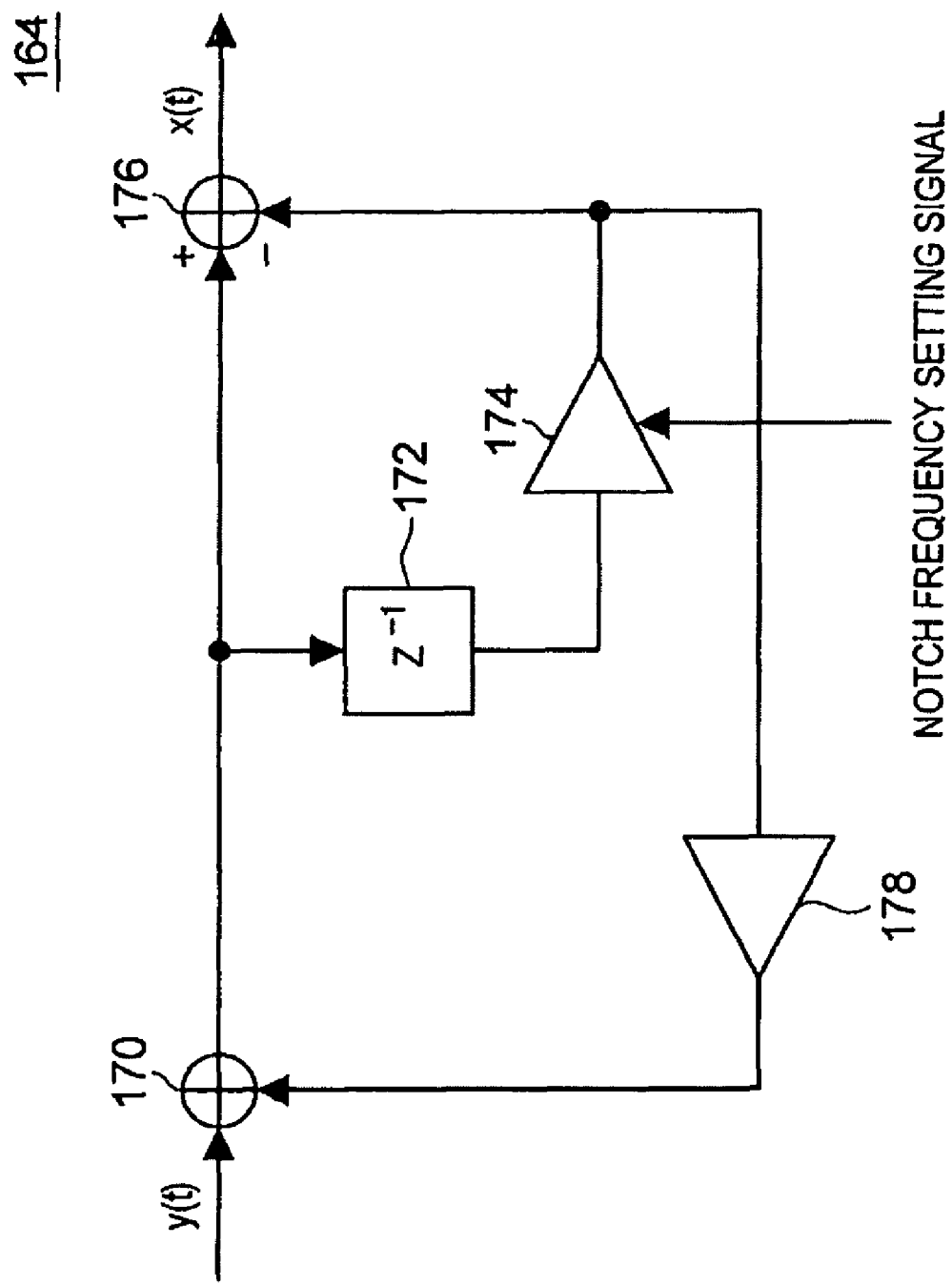

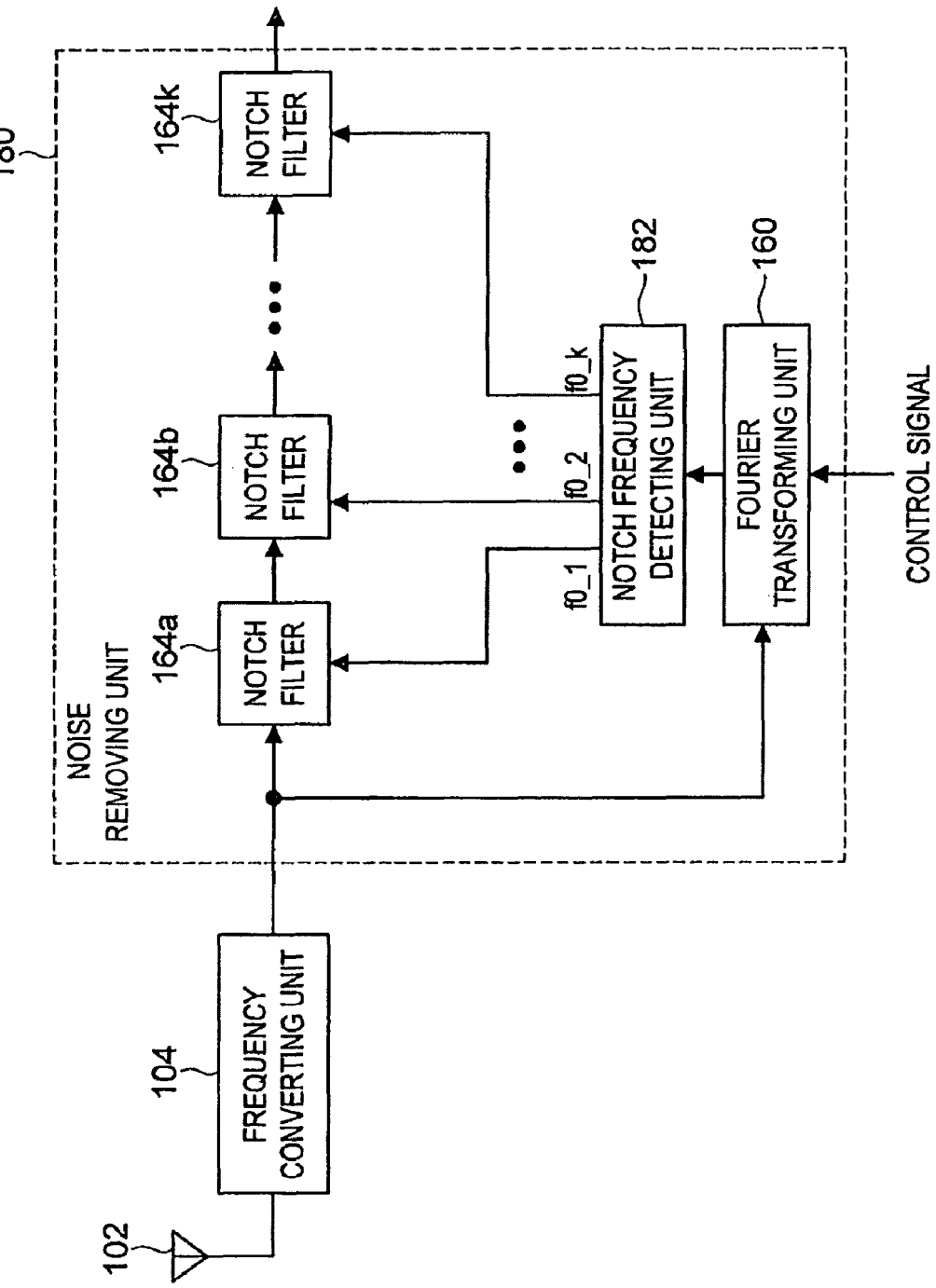

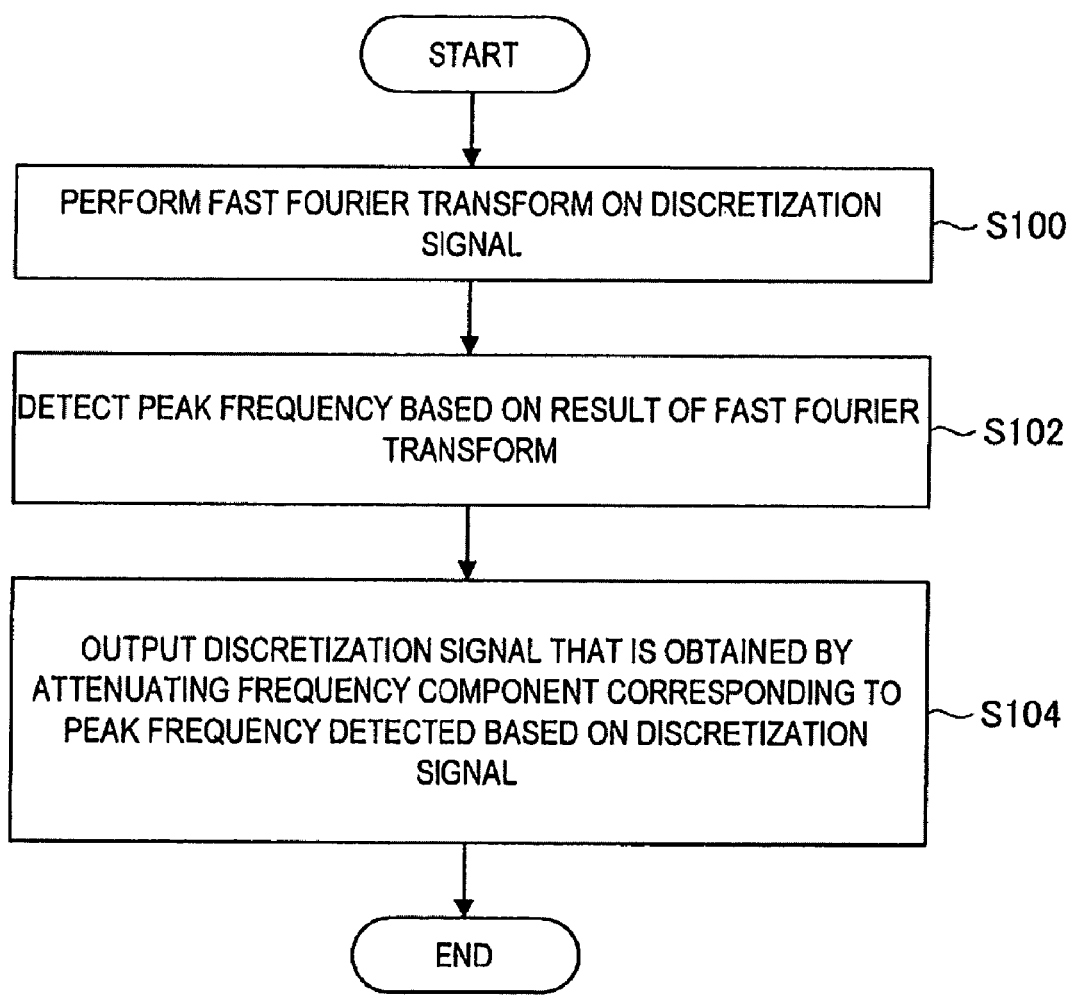

COMMUNICATION DEVICE, NOISE REMOVING METHOD, AND PROGRAM

CROSS REFERENCES TO RELATED APPLICATIONS

The present invention contains subject matter related to Japanese Patent Application JP 2008-044496 filed in the Japan Patent Office on Feb. 26, 2008, the entire contents of which being incorporated herein by reference.

BACKGROUND OF THE INVENTION

1. Field of the Invention

The present invention relates to a communication device, a noise removing method, and a program.

2. Description of the Related Art

In recent years, a GPS (Global Positioning System) function is mounted in various electronic apparatuses, such as a car navigation device, a portable communication device like a mobile phone, or a digital still camera. The electronic apparatus includes a GPS receiving device (an example of a communication device) that receives a transmission signal called a GPS L1 C/A code signal that is transmitted from four or more GPS satellites and specifies a position based on the received transmission signal or functions as a GPS receiving device, thereby realizing the GPS function.

The GPS receiving device that is included in the electronic apparatus demodulates a signal from each GPS satellite to acquire orbital data of each GPS satellite, derives a three-dimensional position of the GPS receiving device by a simultaneous equation using the orbital data, time information, and a delay time of the received signal, and specifies the position. In this case, the GPS receiving device uses orbital data of a plurality of GPS satellites in order to remove an influence due to an error between internal time information of the GPS receiving device and time information in each GPS satellite.

In this case, a transmission signal that is transmitted from each GPS satellite is a signal that is obtained by performing BPSK (Binary Phase Shift Keying) modulation on a carrier of 1575.42 MHz, based on a spectrum spread signal that is obtained by subjecting data of 50 bps to a spectrum spread using a Gold code where a code length is 1023 and a chip rate is at 1.023 MHz. Accordingly, when the GPS receiving device receives a transmission signal from each GPS satellite and demodulates a transmitted spectrum spread signal, it may be requested to synchronize a spread code, a carrier, and data.

A technology that is related to a communication device that receives a transmission signal where a spectrum spread signal subjected to a spectrum spread is modulated has been developed. A technology that quickly performs synchronous capturing of a spread code in a transmission signal transmitted from a GPS satellite is disclosed in Patent Document 1 as one example.

Meanwhile, the electronic apparatus that has a GPS function has had multifunction and high performance, and unnecessary radiation that is generated in the electronic apparatus has increased. The unnecessary radiation that is generated in the electronic apparatus corresponds to an external noise due to a GPS receiving device (or GPS receiving device of an electronic apparatus, hereinafter, this is applicable) that is included in the electronic apparatus. In this case, representative examples that become factors of the external noise due to the unnecessary radiation may include a clock signal that interferes through coupling or space between wiring lines in the electronic apparatus, harmonics due to a high speed signal that passes through a data bus, a variation in load of a circuit, or a variation in power due to a switching regulator.

When the external noise is applied to an analog circuit of the GPS receiving device, if the external noise has the same level as a normal thermal noise (for example, −111 [dBm] when the thermal noise is converted into a bandwidth of 2 MHz) that is generated in the GPS receiving device, the GPS receiving device can normally demodulate the spectrum spread signal. However, when the external noise is stronger than the normal thermal noise that is generated in the GPS receiving device, reception sensitivity is deteriorated by the amount exceeding the level of the normal thermal noise. If the reciprocal of a "ratio between a received transmission signal and a thermal noise+an external noise" (S/(N+I)) approximates to a process gain, the GPS receiving device may not normally demodulate the spectrum spread signal.

Accordingly, for example, as in the GPS receiving device, in a communication device that receives a transmission signal where a spectrum spread signal subjected to a spectrum spread is modulated, an influence due to the external noise needs to be removed as much as possible, in order to normally demodulate the spectrum spread signal.

Among them, a technology for removing an external noise in a communication device that receives a transmission signal where a spectrum spread signal subjected to a spectrum spread is modulated has been developed. In order to remove the external noise in the GPS receiving device, a technology using a notch filter (it may also be referred to as a band-elimination filter) is disclosed in a Non-Patent Document 1 as one example.

[Patent Document 1] JP-A-2003-232844

[Non-Patent Document 1] Daniele Borio, Laura Camoriano, Paolo Mulassano, "Analysis of the One-Pole Notch Filter for Interference Mitigation: Wiener Solution and Loss Estimation", ION GNSS 19th International Technical Meeting of the Satellite Division, 26-29 September 2006, pp. 1849-1860.

The communication device where the technology for removing an external noise according to the related art is applied includes a notch filter that attenuates a signal corresponding to a set notch frequency. The communication device controls the notch frequency of the notch filter, thereby removing the external noise that is generated due to the unnecessary radiation. In this case, the communication device where the technology for removing an external noise according to the related art is applied uses an LMS (Least Mean Square) algorithm that is generally used in an adaptive filter, thereby controlling the notch frequency of the notch filter. However, in the LMS algorithm where the technology for removing an external noise according to the related art is used, in order to control the notch frequency, a feedback operation needs to be performed on a signal that is used to remove the external noise. For this reason, in the communication device where the technology for removing an external noise according to the related art is applied, it is necessary to consider convergence as a control loop. That is, in the communication device where the technology for removing an external noise according to the related art is applied, an unstable operation, such as divergence, may be generated depending on setting of the control loop or a signal (signal used to remove the external noise) input to the notch filter.

Accordingly, the communication device using the technology for removing an external noise according to the related art cannot stably remove the external noise. Further, no description is given to a method of removing the external noise in the communication device according to the related art that quickly performs synchronous capturing of a spread code.

Even though the technologies according to the related art are combined, it may not be possible to stably remove the external noise.

Further, as a countermeasure that removes an influence due to the external noise as much as possible, for example, a shield material or a shield case is used in the communication device (or electronic apparatus where the communication device is mounted), thereby suppressing unnecessary radiation. However, since the above countermeasure affects a design or cost of the communication device (or electronic apparatus where the communication device is mounted), the above countermeasure is not preferable.

SUMMARY OF THE INVENTION

Accordingly, the present invention addresses the above-identified and other issues associated with conventional methods and apparatuses. There is a need for a communication device, a noise removing method, and a program that can stably remove an external noise from a transmission signal where a spectrum spread signal is modulated.

According to an embodiment of the present invention, there is provided a communication device. The communication device includes a communication antenna that receives a transmission signal where a spectrum spread signal subjected to a spectrum spread is modulated; an intermediate frequency converting unit that converts the transmission signal received by the communication antenna into an intermediate frequency signal having a predetermined frequency; an analog to digital converting unit that discretizes the intermediate frequency signal and outputs a discretization signal; a noise removing unit that detects a noise other than a normal thermal noise included in the discretization signal and removes the detected noise from the discretization signal; and a demodulating unit that demodulates the spectrum spread signal, based on the discretization signal that is output from the noise removing unit.

By this configuration, an external noise can be stably removed from a transmission signal where a spectrum spread signal is modulated.

The noise removing unit may include a first Fourier transforming unit that performs a fast Fourier transform on the discretization signal; a frequency detecting unit that detects a frequency whose amplitude is a predetermined value or more as a peak frequency of the noise, based on a result of the fast Fourier transform in the first Fourier transforming unit; and a notch filter that sets the peak frequency detected in the frequency detecting unit as a notch frequency, and outputs a discretization signal where a frequency component corresponding to the set notch frequency is attenuated based on the discretization signal.

By this configuration, an external noise can be stably removed from a transmission signal where a spectrum spread signal is modulated.

The noise removing unit may further include a first adaptive filter that outputs a discretization signal that minimizes a mean squared error with respect to an ideal discretization signal in an ideal state not including the noise.

By this configuration, it is possible to stably remove a single frequency noise, a narrowband noise where a noise band is narrow, and a broadband noise.

The communication device may further include a level detecting unit that detects an average value or an integration value in a predetermined time of the discretization signal; and an adjustment signal output unit that outputs an adjustment signal to selectively operate the notch filter and the first adaptive filter, based on the average value or the integration value detected by the level detecting unit and a predetermined threshold value.

By this configuration, an S/N ratio of a spectrum spread signal can be prevented from being lost due to removing of a noise.

The noise removing unit may further include a plurality of notch filters, and in the notch filters, the peak frequencies that are detected by the frequency detecting unit may be set in the order of the peak frequencies having large amplitude.

By this configuration, it is possible to stably remove a plurality of single frequency noises or narrowband noises where a noise band is narrow.

The frequency detecting unit may periodically or randomly perform a fast Fourier transform on the discretization signal, and the notch filter may set the notch frequency, when the peak frequency is detected in the frequency detecting unit.

By this configuration, it is possible to remove an external noise while reducing a loss of consumed power.

The noise removing unit may include a second Fourier transforming unit that performs a fast Fourier transform on the discretization signal and derives a power spectrum based on a result of the fast Fourier transform; and a first Wiener filter that outputs a discretization signal that minimizes a mean squared error with respect to an ideal discretization signal in an ideal state not including the noise, based on the discretization signal, the power spectrum output from the second Fourier transforming unit, and reference power per unit frequency.

By this configuration, an external noise can be stably removed from a transmission signal where a spectrum spread signal is modulated.

The noise removing unit may include a third Fourier transforming unit that performs a fast Fourier transform on the discretization signal; a first determining unit that selectively outputs a result of the fast Fourier transform in the third Fourier transforming unit or a power spectrum derived from the result of the fast Fourier transform, based on the result of the fast Fourier transform and the power spectrum; a second Wiener filter that outputs a discretization signal that minimizes a mean squared error with respect to an ideal discretization signal in an ideal state not including the noise, based on the power spectrum and reference power per unit frequency, when the power spectrum is output from the first determining unit; and an inversed Fourier transforming unit that performs an inversed fast Fourier transform on the result of the fast Fourier transform output from the first determining unit or the discretization signal output from the second Wiener filter.

By this configuration, an external noise can be stably removed from a transmission signal where a spectrum spread signal is modulated.

The noise removing unit may include a plurality of band-pass filters each of which detects a predetermined frequency band detection signal from the discretization signal; a plurality of second adaptive filters that correspond to the band-pass filters, and selectively output the detection signal or a discretization signal that minimizes a mean squared error with respect to an ideal discretization signal in an ideal state not including the noise; and a synthesizing unit that synthesizes the discretization signals output from the second adaptive filters. Each of the second adaptive filters may include a second determining unit that selectively outputs the detection signal or a power spectrum derived from the detection signal, based on the power spectrum; and a third Wiener filter that outputs a discretization signal that minimizes a mean squared error with respect to the ideal discretization signal, based on the power spectrum and reference power per unit frequency, when the power spectrum is output from the second determining unit.

By this configuration, an external noise can be stably removed from a transmission signal where a spectrum spread signal is modulated.

The noise removing unit may detect the noise other than the normal thermal noise included in the discretization signal without performing a feedback operation on the discretization signal.

By this configuration, an external noise can be stably removed from a transmission signal where a spectrum spread signal is modulated.

The analog to digital converting unit may include an analog to digital converter that has a resolution of N bits (N is an integer) larger than the number of bits corresponding to average amplitude of the normal thermal noise, and converts an input analog signal into a digital signal, and the analog to digital converter sets the average amplitude of the normal thermal noise as lower M bits (M is an integer where N>•M).

By this configuration, an external noise can be more surely removed from a transmission signal where a spectrum spread signal is modulated.

The communication device may further include a bit number determining unit that sets the number of bits of the discretization signal output from the noise removing unit as P bits (P is an integer where N>•P).

By this configuration, it is possible to reduce the sizes of an operator or a register and a memory that constitute a demodulating unit that can demodulate a spectrum spread signal.

The communication device may further include a frequency converting unit that converts a signal into a discretization signal where a central frequency of the discretization signal output from the analog to digital converting unit is set as zero, the intermediate frequency converting unit sets the predetermined frequency as a frequency other than zero, and the noise removing unit receives the discretization signal that is output from the frequency converting unit.

By this configuration, it is possible to improve easiness of a process of removing a noise.

According to the embodiments of the present invention described above, there is provided a noise removing method that can use a communication device including a communication antenna that receives a transmission signal where a spectrum spread signal subjected to a spectrum spread is modulated, an intermediate frequency converting unit that converts the transmission signal received by the communication antenna into an intermediate frequency signal having a predetermined frequency, and an analog to digital converting unit that discretizes the intermediate frequency signal and outputs a discretization signal, and removes a noise other than a normal thermal noise included in the discretization signal. The noise removing method includes the steps of: performing a fast Fourier transform on the discretization signal; detecting a frequency whose amplitude is a predetermined value or more as a peak frequency of the noise, based on a result of the fast Fourier transform in the performing of the fast Fourier transform; and outputting a discretization signal where a frequency component corresponding to the peak frequency set detected in the detecting of the frequency is attenuated, based on the discretization signal.

By using this method, an external noise can be stably removed from a transmission signal where a spectrum spread signal is modulated.

According to the embodiments of the present invention described above, there is provided a noise removing method that can use a communication device including a communication antenna that receives a transmission signal where a spectrum spread signal subjected to a spectrum spread is modulated, an intermediate frequency converting unit that converts the transmission signal received by the communication antenna into an intermediate frequency signal having a predetermined frequency, and an analog to digital converting unit that discretizes the intermediate frequency signal and outputs a discretization signal, and removes a noise other than a normal thermal noise included in the discretization signal. The noise removing method includes the steps of: performing a fast Fourier transform on the discretization signal and deriving a power spectrum based on a result of the fast Fourier transform; and outputting a discretization signal that minimizes a mean squared error with respect to an ideal discretization signal in an ideal state not including the noise, based on the discretization signal, the power spectrum derived in the deriving of the power spectrum, and reference power per unit frequency.

By using this method, an external noise can be stably removed from a transmission signal where a spectrum spread signal is modulated.

According to the embodiments of the present invention described above, there is provided a program that can be used in a communication device including a communication antenna that receives a transmission signal where a spectrum spread signal subjected to a spectrum spread is modulated, an intermediate frequency converting unit that converts the transmission signal received by the communication antenna into an intermediate frequency signal having a predetermined frequency, and an analog to digital converting unit that discretizes the intermediate frequency signal and outputs a discretization signal, and removes a noise other than a normal thermal noise included in the discretization signal. The program allows a computer to execute the steps of: performing a fast Fourier transform on the discretization signal; detecting a frequency whose amplitude is a predetermined value or more as a peak frequency of the noise, based on a result of the fast Fourier transform in the performing of the fast Fourier transform; and outputting a discretization signal where a frequency component corresponding to the peak frequency set detected in the detecting of the frequency is attenuated, based on the discretization signal.

By using this program, an external noise can be stably removed from a transmission signal where a spectrum spread signal is modulated.

According to the embodiments of the present invention described above, there is provided a program that can be used in a communication device including a communication antenna that receives a transmission signal where a spectrum spread signal subjected to a spectrum spread is modulated, an intermediate frequency converting unit that converts the transmission signal received by the communication antenna into an intermediate frequency signal having a predetermined frequency, and an analog to digital converting unit that discretizes the intermediate frequency signal and outputs a discretization signal, and removes a noise other than a normal thermal noise included in the discretization signal. The program allows a computer to execute the steps of: performing a fast Fourier transform on the discretization signal and deriving a power spectrum based on a result of the fast Fourier transform; and outputting a discretization signal that minimizes a mean squared error with respect to an ideal discretization signal in an ideal state not including the noise, based on the discretization signal, the power spectrum derived in the deriving of the power spectrum, and reference power per unit frequency.

By using this program, an external noise can be stably removed from a transmission signal where a spectrum spread signal is modulated.

According to the embodiments of the present invention described above, an external noise can be stably removed from a transmission signal where a spectrum spread signal is modulated.

BRIEF DESCRIPTION OF THE DRAWINGS

FIG. 6 is a diagram illustrating an example of the configuration of a communication device according to a first embodiment of the present invention.

FIG. 8 is a diagram illustrating an example of the configuration of a notch filter that is included in a communication device according to a first embodiment of the present invention.

FIG. 10 is a diagram illustrating the configuration of a noise removing unit according to a modification of a first embodiment of the present invention.

FIG. 11 is a flowchart illustrating a noise removing method according to a first embodiment of the present invention.

DETAILED DESCRIPTION OF THE PREFERRED EMBODIMENTS

Figure 1:
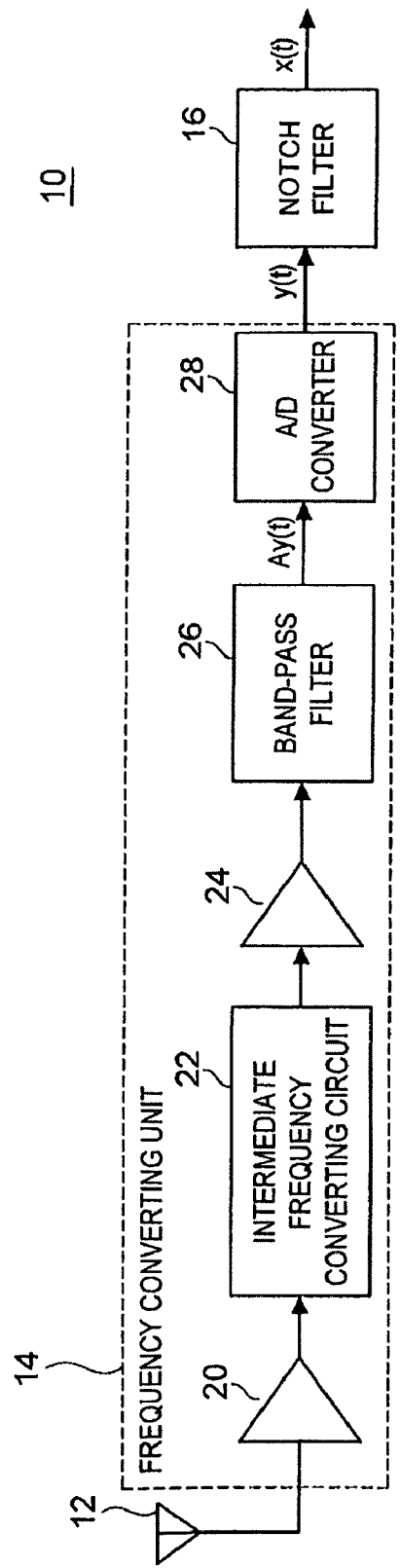
FIG. 1 is a diagram illustrating a portion of the configuration of a communication device according to the related art.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(Issues in a Communication Device According to the Related Art)

Before describing a communication device according to an embodiment of the present invention, first, issues in the communication device according to the related art will be described.

[Configuration of a Communication Device According to the Related Art]

FIG. 1 is a diagram illustrating a portion of the configuration of a communication device 10 according to the related art. In FIG. 1, a demodulating unit that demodulates a spectrum spread signal is not shown.

Referring to FIG. 1, the communication device 10 includes a communication antenna 12, a frequency converting unit 14, and a notch filter 16. In addition, an output x(t) of the notch filter 16 is input to the demodulating unit (not shown).

Further, the communication device 10 may further include, for example, a control unit (not shown) that is configured using an MPU (Micro Processing Unit) and can control the entire communication device 10, a ROM (Read Only Memory) (not shown) where recorded is control data, such as a program or an operation parameter, which is used by the control unit, a RAM (Random Access Memory) (not shown) that primarily stores a program executed by the control unit, and a storage unit (not shown) that can store a variety of data, such as display data for an user interface, or an application. The communication device 10 connects the above-described constituent elements using a bus that functions as a data transmission path, for example. Further, the control unit (not shown) can function as the demodulating unit (not shown).

In this case, as the storage unit (not shown), for example, a magnetic recording medium, such as a hard disk, or a non-volatile memory, such as a flash memory, is exemplified, but the present invention is not limited thereto.

The communication antenna 12 receives a transmission signal that is transmitted from an external device, such as a GPS satellite. In this case, the transmission signal is a signal that is obtained by modulating a spectrum spread signal subjected to spectrum spread. Examples of the transmission signal may include a signal that is obtained by performing BPSK modulation on a carrier of 1575.42 MHz, based on a spectrum spread signal that is obtained by subjecting data of 50 bps to spectrum spread using a Gold code where a code length is 1023 and a chip rate is at 1.023 MHz. In the description below, the transmission signal that is transmitted from the external device is also referred to as an RF (Radio Frequency) signal.

The frequency converting unit 14 includes a low noise amplifier 20 (hereinafter, also referred to as "LNA"), an intermediate frequency converting circuit 22, an amplifier 24, a band-pass filter 26 (hereinafter, also referred to as "BPF"), and an A/D converter 28 (Analog to Digital Converter).

The LNA 20 amplifies an RF signal that is received by the communication antenna 12. The intermediate frequency converting circuit 22 converts (down-converts) a frequency of the RF signal, which is amplified by the LNA 20, into an intermediate frequency (hereinafter, also referred to as "IF") that is lower than a carrier frequency, such as, for example, 4.092 MHz or 1.023 MHz, such that digital signal processing can be easily executed.

The amplifier 24 is composed, for example, of an operational amplifier, and amplifies an IF signal whose frequency has been converted from the carrier frequency that is output from the intermediate frequency converting circuit 22. The BPF 26 passes only a specific frequency band signal with respect to the amplified IF signal that is output from the amplifier 24, and attenuates the other band signals. In this case, the signal that is processed by the elements from the LNA 20 to the BPF 26 is an analog signal.

The A/D converter 28 discretizes a signal based on an analog IF signal Ay(t) that is output from the BPF 26, and outputs an IF signal y(t) as a digital signal. Hereinafter, the IF signal as the digital signal is referred to as a discretization signal.

By the above-described configuration, the frequency converting unit 14 can convert the frequency of the RF signal received by the communication antenna 12 into the IF signal that is down-converted to the intermediate frequency (IF), and output the discretization signal y(t).

Figure 2:
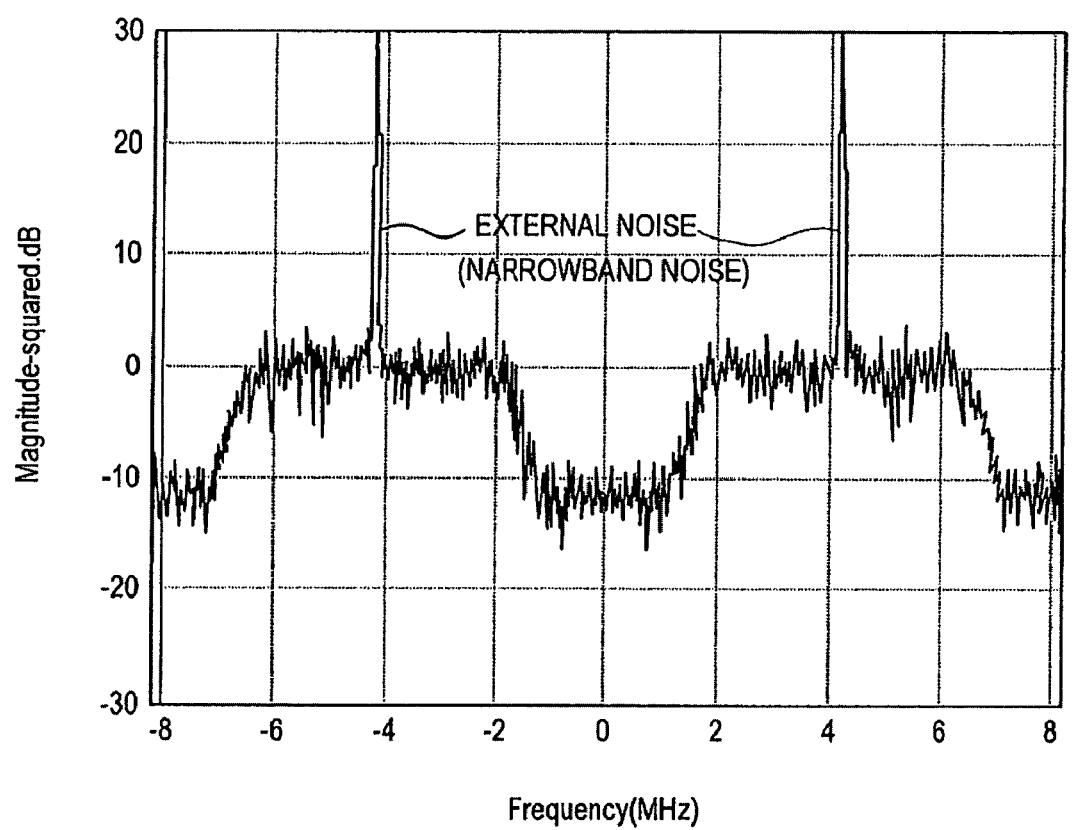
FIG. 2 is a diagram illustrating an example of a discretization signal that includes an external noise.

FIG. 2 is a diagram illustrating an example of a discretization signal y(t) that includes an external noise, which shows an output spectrum (center of 4 MHz) of an A/D converter. In this case, the discretization signal y(t) includes a spectrum spread signal that becomes a demodulation subject transmitted from the external device, a normal thermal noise that is generated by the communication device 10, and an external noise. Specifically, FIG. 2 shows an example of the case a narrowband noise using 4.1 MHz as a peak is included as an external noise. Further, as described above, in the spectrum spread signal that is transmitted from the external device, such as the GPS satellite, its signal level is generally lower than that of the external noise. In the example of FIG. 2, a spectrum spread signal is buried in a normal thermal noise.

The notch filter 16 removes the external noise from the discretization signal y(t) that is output from the frequency converting unit 14, by applying rapid attenuation to a specific frequency (notch frequency), and outputs a discretization signal x(t) where an external noise corresponding to the notch frequency is removed.

Further, the notch filter 16 feeds backs the discretization signal x(t) where the external noise is removed with respect to the input discretization signal y(t), thereby appropriately setting a notch frequency. That is, the notch filter 16 includes a control loop that feed backs the discretization signal x(t) with respect to the discretization signal y(t).

The discretization signal x(t) that is output from the notch filter 16 is input to the demodulating unit (not shown). The demodulating unit (not shown) synchronizes a spread code, a carrier, and data to execute a de-spread process, thereby demodulating the spectrum spread signal.

Since the communication device 10 according to the related art includes the above-described notch filter 16, the communication device 10 can remove a signal that corresponds to the appropriately set notch frequency. That is, the communication device 10 controls the notch frequency, thereby removing the external noise that is shown in FIG. 2. Further, the communication device 10 can demodulate the spectrum spread signal, when the external noise shown in FIG. 2 is removed.

[Issues of a Communication Device According to the Related Art]

[1] First Issue

Since the communication device 10 according to the related art includes the notch filter 16, the communication device 10 can remove the signal that corresponds to the notch frequency. However, the communication device 10 is configured to set the notch frequency using the control loop that feeds back the discretization signal x(t) where the external noise is removed with respect to the input discretization signal y(t). That is, in order to set the notch frequency that is effective when the external noise is removed, the communication device 10 needs to consider convergence of the control loop. Accordingly, it is not possible to set the notch frequency that is effective when the external noise is removed, for example, using the setting of the control loop or the discretization signal y(t) that is input to the notch filter 16. Alternatively, an unstable operation such as divergence of the control loop, may be generated.

As described above, when the notch filter 16 performs an unstable operation, the notch filter 16 cannot remove the external noise. Further, demodulation of the spectrum spread signal will be, of course, far from normalcy. Accordingly, the communication device 10 according to the related art cannot stably remove the external noise.

[2] Second Issue

In the case where the external noise is applied to an analog circuit of the communication device, when the external noise is stronger than a normal thermal noise (for example, −111 [dBm] when the thermal noise is converted into a band width of 2 MHz) that is generated in the communication device, if a reciprocal of a ratio between a received transmission signal (RF signal) and a thermal noise+an external noise (hereinafter, referred to as "S/(N+I)" where "S" indicates the received transmission signal, "N" indicates the thermal noise, and "I" indicates the external noise) approximates to process gain, the communication device may not normally demodulate the spectrum spread signal. For this reason, the communication device 10 according to the related art includes the notch filter 16 to remove the external noise.

However, even when the reciprocal of S/(N+I) is sufficiently smaller than the process gain, if the analog circuit is saturated due to the strong external noise, the thermal noise and the spectrum spread signal to be demodulated are suppressed. As a result, it may not become possible to demodulate the spectrum spread signal. In this case, an A/D converter that outputs a discretization signal in a GPS receiving device that is an example of the communication device 10 according to the related art has a resolution of, for example, 1 bit or 2 bits, because a reception S/N of a GPS signal (an example of the spectrum spread signal) is significantly lower than 0 dB. In addition, in the GPS receiving device, the thermal noise and the spectrum spread signal are basically used in a state where they are saturated to some extent. Accordingly, when the external noise is applied, an output of the A/D converter that is provided at a final stage of the analog circuit in the communication device (for example, GPS receiving device) is particularly easy to be saturated.

Figure 3A:
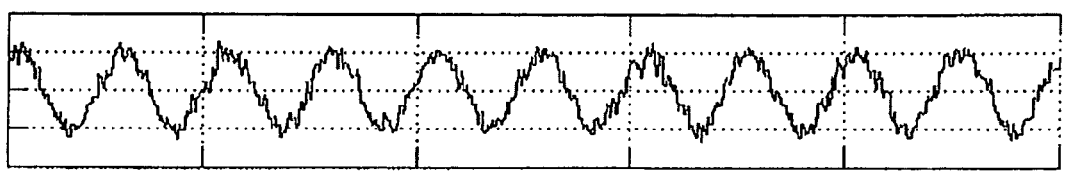
FIG. 3A is a diagram illustrating an example of an output spectrum of an A/D converter in the case where an output of an A/D converter is saturated.
Figure 3B:
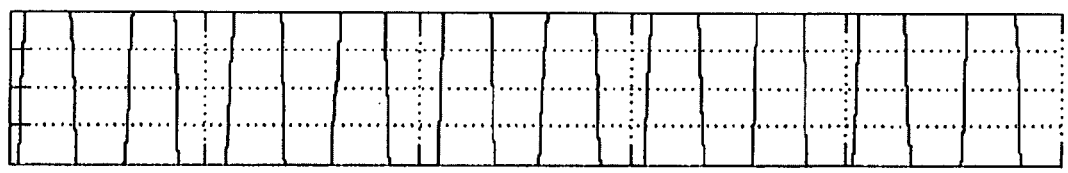
FIG. 3B is a diagram illustrating an example of an output spectrum of an A/D converter in the case where an output of an A/D converter is saturated.

FIGS. 3A and 3B are diagrams illustrating an example of an output spectrum of an A/D converter in the case where an output of the A/D converter is saturated. Specifically, FIG. 3A shows the case where an output of an A/D converter is not saturated, and FIG. 3B shows the case where an output of an A/D converter is saturated. As shown in FIG. 3B, when the output of the A/D converter is saturated, information of the RF signal that becomes an origin of the discretization signal may be lost.

Figure 4A:
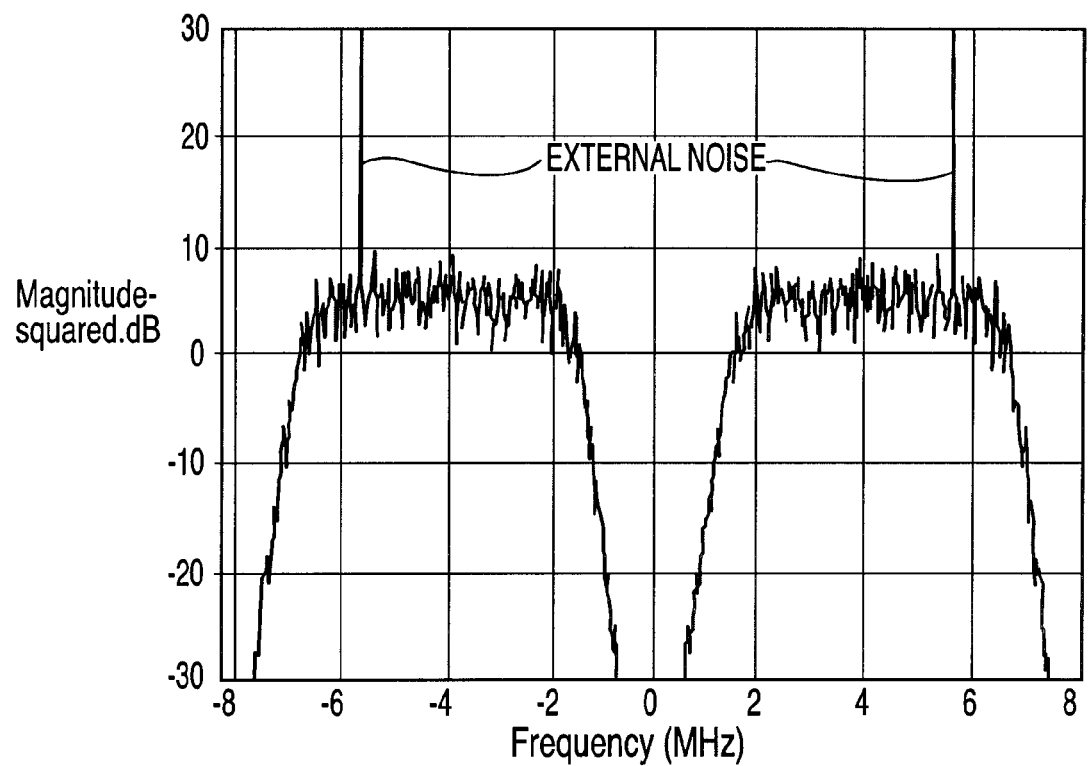
FIG. 4A is a first diagram illustrating a result of the case where an output of an A/D converter is saturated in a communication device according to the related art.
Figure 4B:
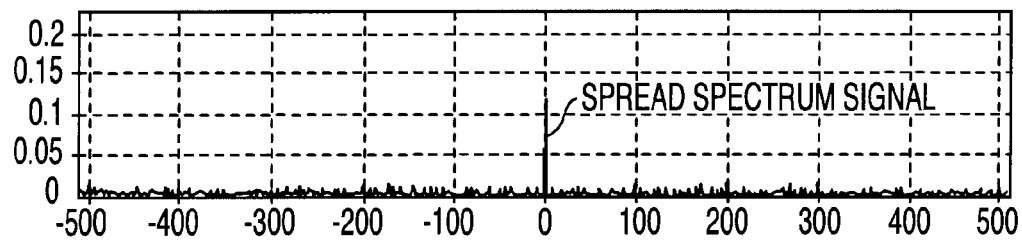
FIG. 4B is a first diagram illustrating a result of the case where an output of an A/D converter is saturated in a communication device according to the related art.

FIGS. 4A and 4B are first diagrams illustrating a result of the case where an output of an A/D converter is saturated in a communication device 10 according to the related art. Specifically, FIG. 4A shows an example of an IF signal that is output from a BPF 26 of a communication device 10. FIG. 4B shows a result of a de-spread process in a demodulating unit (not shown) in the case where an IF signal shown in FIG. 4A is not saturated in an A/D converter 28.

As shown in FIG. 4B, when an output of an A/D converter 28 is not saturated, it can be recognized that a spectrum spread signal is detected in a demodulating unit (not shown).

Figure 5A:
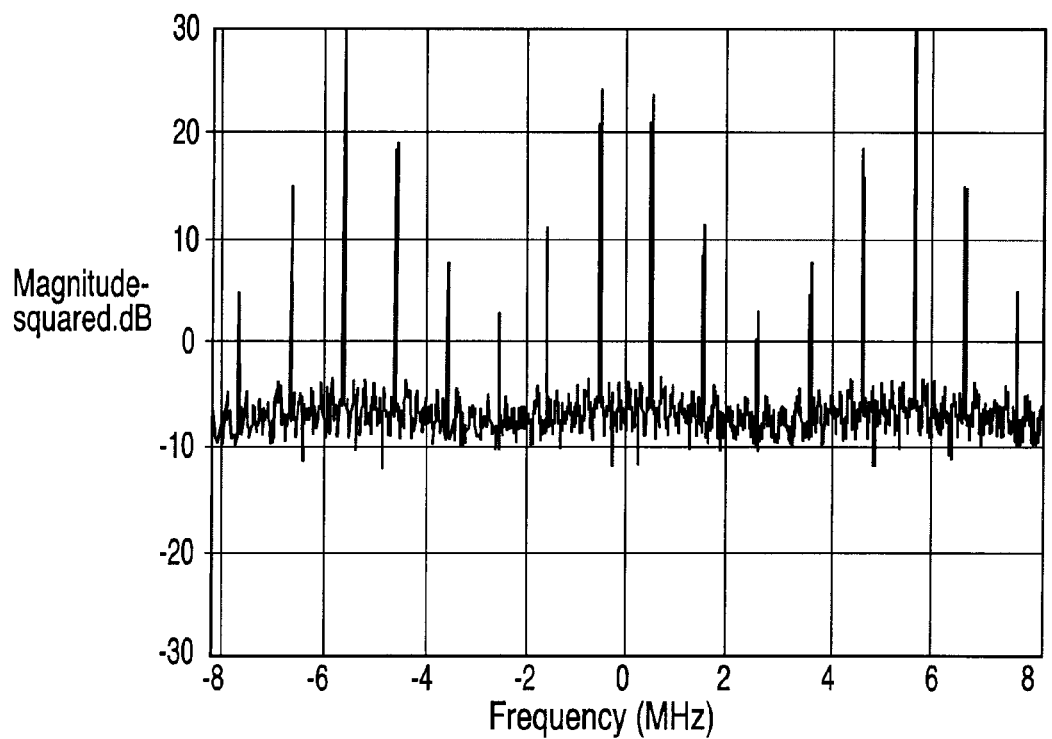
FIG. 5A is a second diagram illustrating a result of the case where an output of an A/D converter is saturated in a communication device according to the related art.
Figure 5B:
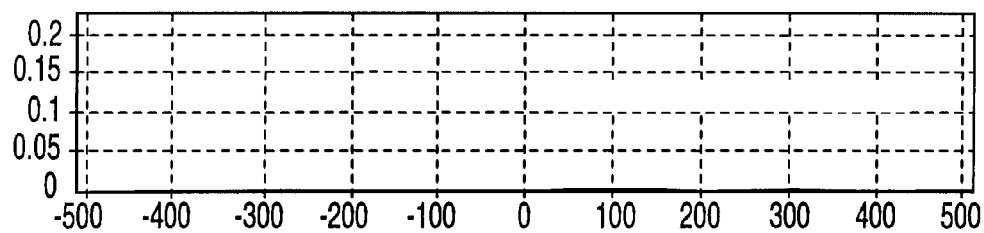
FIG. 5B is a second diagram illustrating a result of the case where an output of an A/D converter is saturated in a communication device according to the related art.

FIGS. 5A and 5B are second diagrams illustrating a result in the case where an output of an A/D converter is saturated in a communication device 10 according to the related art. In this case, FIG. 5A shows an output spectrum of an A/D converter 28 in the case where an IF signal shown in FIG. 4A is saturated in an A/D converter 28. FIG. 5B shows a result of a de-spread process in the case where an output spectrum shown in FIG. 5A is demodulated by a demodulating unit (not shown).

As shown in FIG. 5B, when an output of the A/D converter 28 is saturated, it can be recognized that a spectrum spread signal is not detected in the demodulating unit (not shown).

As shown in FIGS. 4A, 4B, 5A, and 5B, when the output of the A/D converter 28 is saturated, the communication device 10 cannot detect the spectrum spread signal that is included in the IF signal output from the BPF 26, using the demodulating unit (not shown).

In this case, in the communication device 10, since no countermeasure is taken with respect to saturation of the output of the A/D converter 28 that is provided at the final stage of the analog circuit, it is likely for the output of the A/D converter 28 to be saturated. In addition, when the output of the A/D converter 28 is saturated, in the communication device 10, the external noise cannot be removed, and the spectrum spread signal cannot be demodulated.

(Issue Resolving Approach in a Communication Device According to an Embodiment of the Present Invention)

As described above, since the communication device 10 according to the related art has the two issues, that is, the first issue and the second issue, the spectrum spread signal could not be demodulated, even when the communication device 10 receives the spectrum spread signal that is transmitted from the external device. Accordingly, the communication device according to the embodiment of the present invention takes approaches described in the following (1) and (2) with respect to the first issue and the second issue.

(1) Approach with Respect to a First Issue

The communication device according to the embodiment of the present invention includes a noise removing unit that is provided at a rear stage of the A/D converter provided at the final stage of the analog circuit. In addition, the communication device according to the embodiment of the present invention uses the noise removing unit to detect a noise other than a normal thermal noise included in a discretization signal, that is, an external noise included in the discretization signal without performing a feedback operation with respect to the corresponding discretization signal, based on the received RF signal (transmission signal). In addition, the communication device according to the embodiment of the present invention removes the detected noise. In this case, the removing of the noise in the communication device according to the embodiment of the present invention is not limited to the removing of the external noise, but further includes reducing of the external noise.

Since the external noise can be detected without performing the feedback operation with respect to the discretization signal and the detected external noise can be removed, the noise removing unit that removes the noise does not cause an unstable operation depending on the setting of the control loop or the discretization signal, as in the communication device 10 according to the related art. Accordingly, the communication device according to the embodiment of the present invention can stably remove the external noise from a transmission signal where the spectrum spread signal is modulated. Further, since the communication device according to the embodiment of the present invention can stably remove the external noise, the communication device can demodulate the spectrum spread signal more surely than the communication device 10 according to the related art. The specific configuration of the communication device according to the embodiment of the present invention will be described in detail below.

(2) Approach with Respect to a Second Issue

The communication device according to the embodiment of the present invention includes, as the A/D converter provided at the final stage of the analog circuit, an A/D converter that has a resolution of N bits (N is an integer) that are larger than the number of bits corresponding to average amplitude of a normal thermal noise. Further, the communication device according to the embodiment of the present invention sets the average amplitude of the normal thermal noise as lower M bits (M is an integer that satisfies the condition N>M) of the A/D converter.

By the above-described configuration, the A/D converter according to the embodiment of the present invention is not saturated to the external noise stronger than the thermal noise by (N−M)×6 [dB]. In this case, when the GPS signal is received as an example of the spectrum spread signal, a reception S/N of the GPS signal becomes significantly lower than 0 [dB]. Therefore, the A/D converter according to the embodiment of the present invention can set M as M=1 or M=2, for example. At this time, for example, if the A/D converter according to the embodiment of the present invention is composed of a 6-bit A/D converter (that is, N=6), even though an external noise whose level is 24 [dB] higher than that of the normal thermal noise is input, an output spectrum of the A/D converter is not saturated.

Further, it should be noted that the N value and the M value according to the embodiment of the present invention are not limited to N=6 and M=1 or M=2. For example, N that indicates a resolution of the A/D converter according to the embodiment of the present invention can be determined depending on the intensity of an input signal with which an output of the entire analog circuit provided at a previous stage of the A/D converter is saturated. Specifically, for example, when the analog circuit at the previous stage of the A/D converter that is included in the communication device according to the embodiment of the present invention is saturated with input intensity of −90 [dBm], it is possible to spare about 21 [dB] as compared with the normal thermal noise. Therefore, N has a sufficiency of 6 bits. Accordingly, in the above case, the communication device according to the embodiment of the present invention can configure the A/D converter using an A/D converter that has a resolution of 6 bits.

The communication device according to the embodiment of the present invention has the configuration where the output spectrum of the A/D converter can be prevented from being saturated due to the external noise, thereby surely removing the external noise in the noise removing unit that is provided at the rear stage of the A/D converter. Accordingly, the communication device according to the embodiment of the present invention can demodulate the spectrum spread signal more surely than the communication device 10 according to the related art.

Next, the configuration of the communication device according to the embodiment of the present invention will be specifically described. In the description below, it is assumed that the communication device according to the embodiment of the present invention receives a transmission signal (hereinafter, also referred to as an "RF signal") that is transmitted from the external device. In this case, the transmission signal according to the embodiment of the present invention is a signal that is obtained by modulating a spectrum spread signal subjected to spectrum spread. Examples of the transmission signal may include a signal that is obtained by performing BPSK modulation on a carrier of 1575.42 MHz, based on a spectrum spread signal that is obtained by subjecting data of 50 bps to spectrum spread using a Gold code where a code length is 1023 and a chip rate is at 1.023 MHz, but the present invention is not limited thereto. For example, the communication device according to the embodiment of the present invention can communicate with the external device using a CDMA (Code Division Multiple Access) scheme or a scheme based on the IEEE802.11 standard.

(First Embodiment)

First, as a communication device according to a first embodiment, described is a communication device that includes a noise removing unit that mainly removes a single frequency noise or a narrowband noise (external noise) where a band of a noise is narrow. In this case, examples of the narrowband noise may include a noise that is generated by harmonics of a clock signal that drives a digital circuit, other narrowband radio interference, and a power supply noise due to a switching regulator, but the present invention is not limited thereto.

FIG. 6 is a diagram illustrating an example of the configuration of a communication device 100 according to a first embodiment of the present invention. Referring to FIG. 6, the communication device 100 includes a communication antenna 102, a frequency converting unit 104, a noise removing unit 106, a demodulating unit 108, an XO (X'tal Oscillator) 110, and a TCXO (Temperature Compensated X'tal Oscillator) 112.

Further, the communication device 100 may include, for example, a control unit (not shown) that is composed of an MPU or the like and can control the entire communication device 100, a ROM (Read Only Memory) (not shown) where recorded is control data, such as a program or an operation parameter used by the control unit, a RAM (Random Access Memory) (not shown) that primarily stores a program executed by the control unit, a storage unit (not shown) that can store a variety of data, such as display data for a user interface, or an application, an operation unit (not shown) that can be operated by a user, and a display unit (not shown). The communication device 100 connects the above-described various constituent elements, for example, using a bus that functions as a data transmission path. Further, the control unit (not shown) can function as the noise removing unit 106 or the demodulating unit 108.

In this case, examples of the storage unit (not shown) may include, for example, a magnetic recording medium, such as a hard disk, and a nonvolatile memory, such as an EEPROM (Electrically Erasable and Programmable Read Only Memory), a flash memory, an MRAM (Magnetoresistive Random Access Memory), an FeRAM (Ferroelectric Random Access Memory), and a PRAM (Phase change Random Access Memory), but the present invention is not limited thereto.

Further, examples of the operation unit (not shown) may include, for example, an operation input device, such as a keyboard or a mouse, a rotated selector, such as a button, a directional key, and a jog dial, or a combination thereof, but the present invention is not limited thereto. Further, examples of the display unit (not shown) may include, for example, an LCD (Liquid Crystal Display), and an organic EL display (Organic ElectroLuminescence display; it may also be referred to as an OLED display (Organic Light Emitting Diode display)), but the present invention is not limited thereto. Further, the operation unit (not shown) and the display unit (not shown) can be integrally formed, like a touch screen.

The communication antenna 102 receives a transmission signal (RF signal) that is transmitted from an external device, such as a GPS satellite.

The frequency converting unit 104 converts a frequency of the RF signal that is received by the communication antenna 102 into an IF signal (intermediate frequency signal) that is down-converted into an intermediate frequency (IF). In addition, the frequency converting unit 104 discretizes a signal based on an analog IF signal, and outputs a discretization signal. Hereinafter, an example of the configuration of the frequency converting unit 104 will be described.

[Example of the Configuration of a Frequency Converting Unit 104]

The frequency converting unit 104 includes a low noise amplifier 120 (hereinafter, also referred to as an "LNA"), an intermediate frequency converting unit 122, an amplifier 124, a band-pass filter 126 (hereinafter, the band-pass filter may also be referred to as a "BPF"), and an A/D converter 128.

The LNA 120 amplifies an RF signal that is received by the communication antenna 102.

The intermediate frequency converting unit 122 converts (down-converts) the frequency of the RF signal amplified by the LNA 120 into an intermediate frequency (hereinafter, also referred to as an "IF") lower than a carrier frequency of, for example, 4.092 MHz or 1.023 MHz, such that digital signal processing can be easily performed. In this case, an example of the configuration of the intermediate frequency converting unit 122 will be described.

[Example of the Configuration of an Intermediate Frequency Converting Unit 122]

The intermediate frequency converting unit 122 includes a band-pass filter 130, an amplifier 132, a frequency synthesizer 134, and a mixer 136.

The BPF 130 passes only a specific frequency band signal with respect to the amplified RF signal that is output from the LNA 120 and attenuates the other band signals.

The amplifier 132 amplifies an RF signal that is output from the BPF 130. In this case, the amplifier 132 can be composed of, for example, a MOSFET (Metal Oxide Semiconductor Field effect transistor) differential amplifier, but the present invention is not limited thereto.

The frequency synthesizer 134 generates a local oscillation signal having a predetermined frequency, based on an oscillation signal that is supplied from the TCXO 112 (which will be described in detail below). In this case, the frequency synthesizer 134 is controlled by, for example, an MPU 144 that is included in the demodulating unit 108, but the present invention is not limited thereto. The frequency synthesizer 134 may be controlled by a control unit (not shown).

The mixer 136 multiplies the amplified RF signal output from the amplifier 132 by the local oscillation signal that is output from the frequency synthesizer 134. Since the mixer 136 multiplies the RF signal by the local oscillation signal, the mixer 136 can output an IF signal that is down-converted into an intermediate frequency (IF) lower than a carrier frequency, in accordance with the local oscillation signal.

By the above-described configuration, the intermediate frequency converting unit 122 outputs the IF signal where the frequency of the RF signal is down-converted into the intermediate frequency.

The amplifier 124 amplifies the IF signal that is output from the intermediate frequency converting unit 122. In this case, the amplifier 124 can be composed of, for example, an operational amplifier, but the present invention is not limited thereto.

The BPF 126 passes only a specific frequency band signal with respect to the amplified IF signal that is output from the amplifier 124, and attenuates the other band signals. The communication device according to the embodiment of the present invention can configure the BPF 126 using a low-pass filter that attenuates a signal having a frequency higher than a cutoff frequency. In this case, the signal that is processed by the elements from the LNA 120 to the BPF 126 is an analog signal.

The A/D converter 128 discretizes a signal based on an analog IF signal that is output from the BPF 126, and outputs a discretization signal. In this case, the A/D converter 128 is composed of an A/D converter that has a resolution of N bits and sets average amplitude of a normal thermal noise as lower M bits of the A/D converter 128. Accordingly, the A/D converter 128 can prevent an output spectrum of the A/D converter from being saturated due to the external noise, and surely remove the external noise in the noise removing unit 106 that is provided at a rear stage of the A/D converter 128.

By the above-described configuration, the frequency converting unit 104 can convert the frequency of the RF signal received by the communication antenna 102 into the IF signal that is obtained by down-converting the intermediate frequency (IF), and output the discretization signal as a digital signal.

The noise removing unit 106 detects an external noise without performing a feedback operation with respect to the discretization signal and remove the external noise, based on the discretization signal that is output from the frequency converting unit 104. Hereinafter, an example of the configuration of the noise removing unit 106 according to the first embodiment will be described.

[Example of the Configuration of a Noise Removing Unit 106]

Figure 7:
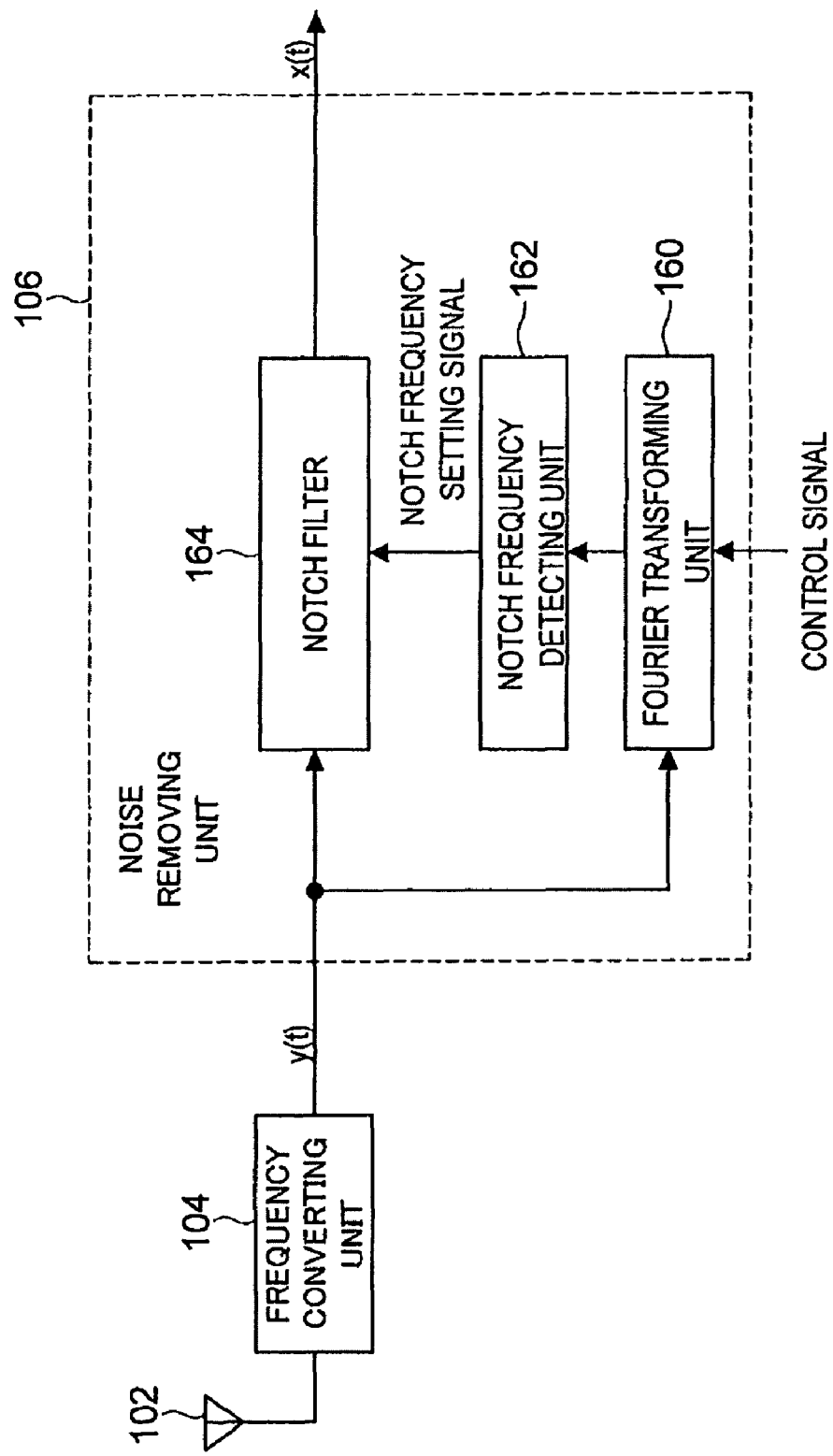
FIG. 7 is a diagram illustrating an example of the configuration of a noise removing unit according to a first embodiment of the present invention.

FIG. 7 is a diagram illustrating the configuration of a noise removing unit 106 according to a first embodiment of the present invention. In FIG. 7, the communication antenna 102 and the frequency converting unit 104 are shown together. In FIG. 7, a discretization signal that has the possibility of including an external noise output from the frequency converting unit 104 is shown as a discretization signal y(t), and the discretization signal after removing the noise is shown as a discretization signal x(t).

Referring to FIG. 7, the noise removing unit 106 includes a Fourier transforming unit 160 (first Fourier transforming unit), a notch frequency detecting unit 162, and a notch filter 164.

The Fourier transforming unit 160 performs a fast Fourier transform (hereinafter, also referred to as an "FFT") on the discretization signal that is output from the frequency converting unit 104. In addition, the Fourier transforming unit 160 transmits a result of a fast Fourier transform to the notch frequency detecting unit 162.

Further, the Fourier transforming unit 160 selectively performs, for example, a fast Fourier transform in accordance with a control signal that is transmitted from the MPU 144 of the demodulating unit 108. In this case, for example, in a single frequency noise (external noise) or a narrowband noise (external noise), such as a noise that is generated by harmonics of a clock signal that drives a digital circuit, other narrowband radio interference, and a power supply noise due to a switching regulator, its frequency and amplitude is generally rarely varied over time. Meanwhile, a narrowband radio signal that may become the other external noise is not constantly transmitted and received. For example, in the case where an electric wave is not output, if the notch filter 164 is operated, consumption power may be lost. Accordingly, the communication device 100 transmits a control signal to the Fourier transforming unit 160 periodically such as for every 100 [msec], or during a process routine, thereby allowing the Fourier transforming unit 160 to selectively execute a fast Fourier transform. In addition, when the notch frequency detecting unit 162 detects that amplitude in a frequency region is at a peak of a predetermined value or more based on a result of the fast Fourier transform, for example, the communication device 100 operates the notch filter 164. When the peak is not detected, the communication device 100 stops the notch filter 164. As such, the communication device 100 selectively executes the fast Fourier transform and selectively operates the notch filter 164 based on the result of the fast Fourier transform. As a result, the communication device 100 can remove the external noise while reducing a loss of consumption power. As described above, the communication device 100 selectively executes the fast Fourier transform, and selectively operates the notch filter 164 based on the result of the fast Fourier transform. As a result, even when a frequency is varied in a single frequency noise (external noise) or a narrowband noise (external noise), it is possible to remove the external noise. Further, the Fourier transforming unit 160 can execute the fast Fourier transform, when the discretization signal is transmitted from the frequency converting unit 104.

Further, the Fourier transforming unit 160 can be composed of a dedicated fast Fourier transforming circuit, but the present invention is not limited thereto. For example, the Fourier transforming unit according to the embodiment of the present invention can use (share) a fast Fourier transforming circuit that is used to execute a de-spread process in the demodulating unit 108.

The notch frequency detecting unit 162 detects a notch frequency f0 based on the result of the fast Fourier transform that is transmitted from the Fourier transforming unit 160. In addition, the notch frequency detecting unit 162 transmits a notch frequency setting signal corresponding to the detected notch frequency f0 to the notch filter 164 and allows the notch filter 164 to set the notch frequency f0.

In this case, for example, the notch frequency detecting unit 162 detects a frequency having maximum amplitude among frequencies where the magnitude of amplitude in the discretization signal becomes a peak of a predetermined value or more based on the result of the fast Fourier transform, thereby detecting the notch frequency f0, but the present invention is not limited thereto. The notch frequency detecting unit 162 detects the notch frequency f0 as described above, thereby detecting a frequency that corresponds to a single frequency noise or a narrowband noise to be removed.

The notch frequency detecting unit 162 can be composed of, for example, a peak detecting circuit that has an operational amplifier or a diode and a capacitor, but the present invention is not limited thereto. For example, the notch frequency detecting unit 162 may use a digital signal processing circuit that searches a peak, as the peak detecting circuit. Further, the notch frequency detecting unit 162 allows the peak detecting circuit to directly transmit the notch frequency setting signal to the notch filter 164, thereby setting the notch frequency f0 to the notch filter 164, but the present invention is not limited thereto. For example, information of the notch frequency f0 that is detected by the peak detecting circuit is transmitted to the control unit (not shown) or the MPU that is included in the notch frequency detecting unit 162. The control unit (not shown) or the MPU that is included in the notch frequency detecting unit 162 may transmit the notch frequency setting signal to the notch filter 164, thereby setting the notch frequency f0. As described above, when the notch frequency detecting unit 162 detects that amplitude in a frequency region is at a peak of a predetermined value or more based on the result of the fast Fourier transform, the communication device 100 may operate the notch filter 164. When the peak is not detected, the communication device 100 may stop the notch filter 164.

The notch filter 164 applies rapid attenuation to the set notch frequency f0, thereby removing the external noise from the discretization signal that is output from the frequency converting unit 104. Since the notch filter 164 is a filter that applies rapid attenuation to the notch frequency f0, the notch filter 164 is suitable for mainly removing a single frequency noise or a narrowband noise. In this case, an example of the configuration of the notch filter 164 will be described.

[Example of the Configuration of a Notch Filter 164]

FIG. 8 is a diagram illustrating an example of the configuration of a notch filter 164 that is included in a communication device 100 according to a first embodiment of the present invention.

Referring to FIG. 8, the notch filter 164 includes a first adder 170, a delay element 172, a first multiplier 174, a second adder 176, and a second multiplier 178.

The first adder 170 adds a discretization signal y(t) input to the notch filter 164 and a feedback signal (which will be described in detail below) output from the second multiplier 178, and outputs a first addition signal.

The delay element 172 outputs a delay signal that is obtained by delaying the first addition signal output from the first adder 170 by a first period (one clock) of a sampling period.

The first multiplier 174 performs an operation represented by the following Equation 1, based on the delay signal that is output from the delay element 172, and outputs a multiplication signal. In this case, in Equation 1, "Dout1" denotes a multiplication signal, and "Din1" denotes a delay signal that is input to the first multiplier 34. Further, in Equation 1, "f0" denotes a notch frequency, and "Ts" denotes a sampling period. Further, in the first multiplier 174, the notch frequency f0 is set whenever the notch frequency setting signal is transmitted from the notch frequency detecting unit 162.

$$Dout1 = Din1 \times e^{j \cdot 2\pi \cdot f0 \cdot Ts} \quad \text{[Equation 1]}$$

The second adder 176 subtracts the multiplication signal from the first addition signal. In this case, since the multiplication signal is a signal component that corresponds to the notch frequency, the second adder 176 subtracts the multiplication signal from the first addition signal, thereby applying rapid attenuation to the notch frequency. Accordingly, a discretization signal x(t) from which the external noise corresponding to the notch frequency is removed is output from the second adder 176.

The second multiplier 178 performs an operation represented by the following Equation 2, based on the multiplication signal output from the first multiplier 174, and outputs a feedback signal. In this case, in Equation 2, "Dout2" denotes the feedback signal, and "Din2" denotes the multiplication signal that is input to the second multiplier 38. Further, in Equation 2, "r" denotes a feedback coefficient, and when the feedback coefficient r has a value that is approximated to 1, a notch band is narrowed. Further, the feedback coefficient r may be a previously set fixed coefficient. For example, the feedback coefficient r may be a coefficient whose value is changed in accordance with a signal that is transmitted from the control unit (not shown).

$$Dout2 = Din2 \times r; \ (r<1) \quad \text{[Equation 2]}$$

By the configuration shown in FIG. 8, the notch filter 164 can output a discretization signal x(t) where removed is an external noise corresponding to the notch frequency set in accordance with the notch frequency setting signal transmitted from the notch frequency detecting unit 162.

Figure 9A:
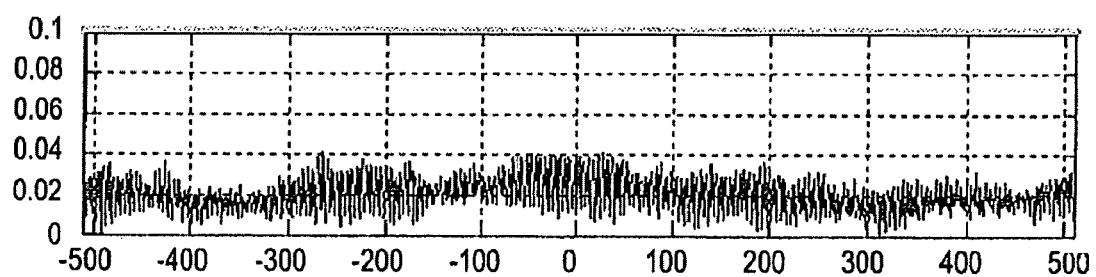
FIG. 9A is a diagram illustrating an effect of when a communication device according to a first embodiment of the present invention includes a noise removing unit.
Figure 9B:
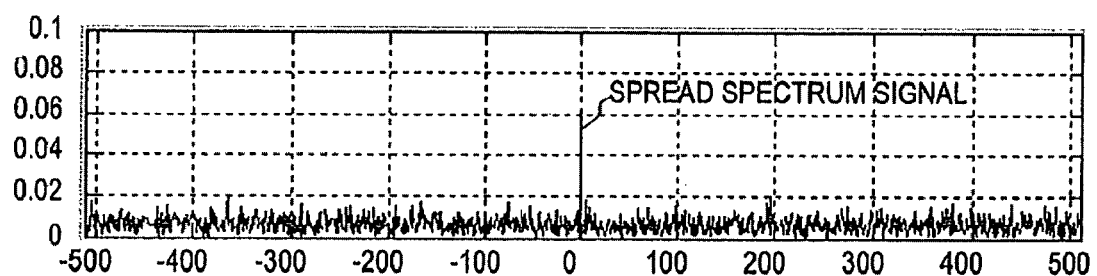
FIG. 9B is a diagram illustrating an effect of when a communication device according to a first embodiment of the present invention includes a noise removing unit.

FIGS. 9A and 9B are diagrams illustrating an effect of when a communication device 100 according to a first embodiment of the present invention includes a noise removing unit 106. In this case, FIG. 9A shows an example of a result of a de-spread process in a demodulating unit 108 in the case where a communication device according to an embodiment of the present invention does not include a noise removing unit 106, and FIG. 9B shows an example of a result of a de-spread process in a demodulating unit 108 in the case where a communication device according to an embodiment of the present invention includes a noise removing unit 106. FIGS. 9A and 9B show a result of a de-spread process in a demodulating unit 108 when an A/D converter 128 outputs a discretization signal y(t) shown in an output spectrum shown in FIG. 2.

As shown in FIGS. 9A and 9B, when the communication device according to the embodiment of the present invention does not include the noise removing unit 106, that is, when the external noise is not removed, a spectrum spread signal is not detected in the demodulating unit 108 (refer to FIG. 9A).

Meanwhile, when the communication device according to the embodiment of the present invention includes the noise removing unit 106, that is, when the external noise is removed, the spectrum spread signal is detected in the demodulating unit 108 (refer to FIG. 9B). In this case, the communication device 100 includes the noise removing unit 106, as shown in FIG. 6. Therefore, since the communication device 100 includes the noise removing unit 106 to remove the external noise, as shown in FIG. 9B, the communication device 100 can detect the spectrum spread signal and demodulate the spectrum spread signal.

Referring back to FIG. 6, the constituent elements of the communication device 100 will be described. The demodulating unit 108 detects a spectrum spread signal based on a discretization signal that is output from the noise removing unit 106 and demodulates the detected spectrum spread signal. Hereinafter, an example of the configuration of the demodulating unit 108 will be described.

[Example of the Configuration of a Demodulating Unit 108]

The demodulating unit 108 includes a synchronous capturing unit 140, a synchronous holding unit 142, an MPU 144, an RTC (Real Time Clock) 146, a timer 148, a memory 150, and a multiplier/divider 152.

The synchronous capturing unit 140 performs synchronous capturing of a spread code in a discretization signal that is output from the noise removing unit 106, based on an oscillation signal in a multiplied and/or divided oscillation signal that is supplied from the multiplier/divider 152, under the control from the MPU 144. Further, the synchronous capturing unit 140 detects a carrier frequency in the discretization signal output from the noise removing unit 106 or device identification information (for example, satellite number to identify a GPS satellite) indicating an external device that becomes a transmission origin of the discretization signal, in addition to the synchronous capturing of the spread code. In addition, the synchronous capturing unit 140 transmits a phase of the detected spread code, the detected carrier frequency, and the detected device identification information to the synchronous holding unit 142 and the MPU 144.

Further, the synchronous capturing unit 140 can be composed of, for example, a digital matched filter using a fast Fourier transform. In this case, the digital matched filter may be exemplified by a digital matched filter using a technology that is disclosed in JP-A-2003-232844, but the present invention is not limited thereto.

The synchronous holding unit 142 synchronously holds a spread code in a discretization signal output from the noise removing unit 106 and a carrier, based on the multiplied and/or divided oscillation signal supplied from the multiplier/divider 152 and a variety of information (a phase of a spread code, a carrier frequency, and device identification information) transmitted from the synchronous capturing unit 140, under the control from the MPU 144. In addition, the synchronous holding unit 142 demodulates data that is included in the discretization signal output from the noise removing unit 106, in addition to the synchronous holding. In this case, the synchronous holding unit 142 starts to execute an initialization process on the phase of the spread code, the carrier frequency, and the device identification information that are transmitted from the synchronous capturing unit 140.

Further, the synchronous holding unit 142 transmits the phase of the detected spread code, the detected carrier frequency, and the detected demodulated data to the MPU 144. In addition, the synchronous holding unit 142 can execute a synchronous holding process in parallel with respect to discretization signals that correspond to transmission signals transmitted from a plurality of GPS satellites (external devices). The synchronous holding unit 142 is exemplified by a synchronous holding unit using a technology that is disclosed in JP-A-2003-232844, but the present invention is not limited thereto.

The MPU 144 executes a process based on the phase of the spread code, the carrier frequency, and the data that are transmitted from the synchronous holding unit 142. For example, the MPU 144 calculates a location and a speed of the communication device 100, and executes various operation processes related to each GPS, for example, in order to correct time information of the communication device 100 based on time information of each GPS satellite (external device) that is obtained from the demodulated data.

Further, the MPU 144 can perform various control operations of the communication device 100 or control operations that are related to an input/output with the external device. In the above case, the MPU 144 functions as the control unit (not shown) in the communication device 100.

The RTC 146 measures time based on an oscillation signal that is supplied from the XO 110. Information of the time that is measured by the RTC 146 is substituted, for example, until the time information of the GPS satellite (external device) is obtained, and when the time information of the GPS satellite is obtained, the MPU 144 controls the timer 148 and appropriately corrects the time information.

The timer 148 is, for example, used to generate by the MPU 144 various timing signals controlling the operations of each of the elements of the communication device 100, or refer to time.

The memory 150 is composed of, for example, a ROM or a RAM. The ROM that constitutes the memory 150 records control data, such as a program or an operation parameter used by the MPU 144. Further, the RAM primarily stores a program that is executed by the MPU 144.

The multiplier/divider 152 multiplies and/or divides an oscillation signal that is supplied from the TCXO 12.

By the above-described configuration, the demodulating unit 108 can detect a spectrum spread signal based on the discretization signal transmitted from the noise removing unit 106 and demodulate the spectrum spread signal.

The XO 10 generates an oscillation signal that has a predetermined oscillation frequency, such as, for example, 32.768 kHz. In addition, the XO 110 supplies the generated oscillation signal to the RTC 146.

The TCXO 112 generates an oscillation signal whose frequency (for example, 18.414 MHz) is different from the frequency of the oscillation signal that is generated by the XO 110. In addition, the TCXO 112 supplies the generated oscillation signal to the multiplier/divider 152 or the frequency synthesizer 134.

As described above, by the configuration shown in FIG. 6, for example, the communication device 100 according to the first embodiment of the present invention receives the transmission signal that is transmitted from the external device, detects the spectrum spread signal included in the received transmission signal, and demodulates the spectrum spread signal. Further, the communication device 100 includes, for example, the noise removing unit 106 that mainly removes a narrowband noise (external noise) shown in FIG. 2 or a single frequency noise (external noise), which is included in the received transmission signal. In this case, the noise removing unit 106 includes the Fourier transforming unit 160, the notch frequency detecting unit 162, and the notch filter 164, and the notch frequency of the notch filter 164 is set based on a result that is obtained by performing a fast Fourier transform on the discretization signal transmitted from the A/D converter 128. Since the noise removing unit 106 detects an external noise without performing a feedback operation on the discretization signal and removes the external noise, the communication device 100 does not perform an unstable operation as in the communication device 10 according to the related art. Accordingly, the communication device 100 can stably remove the external noise from the transmission signal where the spectrum spread signal is modulated. Further, since the communication device 100 can stably remove the external noise, the communication device 100 can surely demodulate the spectrum spread signal.

Further, the A/D converter 128 that is provided at the final stage of the analog circuit that processes an analog signal in the communication device 100 is composed of an A/D converter that has a resolution of N bits that are larger than the number of bits corresponding to average amplitude of a normal thermal noise. In addition, the A/D converter 128 sets the average amplitude of the normal thermal noise as lower M bits of the A/D converter 128. Accordingly, the A/D converter 128 that is included in the communication device 100 can prevent an output spectrum of the A/D converter from being saturated due to the external noise, and surely remove the external noise in the noise removing unit 106 that is provided at the rear stage of the A/D converter 128.

[Modification of a Communication Device According to a First Embodiment]

In the above case, as shown in FIG. 7, the communication device 100 according to the first embodiment includes the noise removing unit 106 that has one notch filter 164. However, the noise removing unit that is included in the communication device according to the first embodiment of the present invention is not limited to the configuration shown in FIG. 7, and can include a plurality of notch filters.

FIG. 10 is a diagram illustrating the configuration of a noise removing unit 180 according to a modification of a first embodiment of the present invention. In FIG. 10, the communication antenna 102 and the frequency converting unit 104 are shown together.

Referring to FIG. 10, the noise removing unit 180 includes a Fourier transforming unit 160, a notch frequency detecting unit 182, and k (k is an integer of 2 or more) notch filters 164a to 164k.

Similar to the Fourier transforming unit 160 shown in FIG. 7, the Fourier transforming unit 160 performs a fast Fourier transform on the discretization signal that is output from the frequency converting unit 104. In addition, the Fourier transforming unit 160 transmits the result of the fast Fourier transform to the notch frequency detecting unit 182.

The notch frequency detecting unit 182 detects as a notch frequency a frequency where the magnitude of amplitude in the discretization signal becomes a peak of a predetermined value or more, based on the result of the fast Fourier transform. In addition, the notch frequency detecting unit 182 transmits notch frequency setting signals corresponding to the detected notch frequencies f0_1, f0_2, . . . , and f0_k to the notch filters 164a to 164k, and sets the notch frequencies to the notch filters 164a to 164k, respectively. In this case, the notch frequency detecting unit 182 can set, for example, the notch frequencies f0_1, f0_2, . . . , and f0_k in the order of the frequencies having large amplitude among the detected notch frequencies, but the present invention is not limited thereto.

FIG. 10 shows the case where the number of notch frequencies detected by the notch frequency detecting unit 182 is the same as the number of notch filters 164k included by the noise removing unit 180, but the present invention is not limited thereto. For example, when the number of notch frequencies detected by the notch frequency detecting unit 182 is smaller than the number of notch filters 164k, the notch frequency detecting unit 182 transmits the notch frequency setting signals corresponding to the notch frequencies that are sequentially detected starting from the notch filter 164a. That is, in the above case, the notch frequency setting signal is not transmitted to some notch filter 164k among the notch filters. At this time, the notch filter 164k where the notch frequency setting signal is not transmitted sets outputs of the multipliers 174 and 178 as 0, for example. Alternatively, the operation of the notch filter 164k is stopped and y(t) of FIG. 8 is bypassed to x(t). Meanwhile, when the number of notch frequencies detected by the notch frequency detecting unit 182 is larger than the number of notch filters 164k, for example, the notch frequency detecting unit 182 transmits the notch frequency setting signals in the order of the notch frequencies having large amplitude among the detected notch frequencies. In the above case, the notch frequency setting signal that corresponds to a portion of the notch frequencies detected by the notch frequency detecting unit 182 are not transmitted.

Each of the notch filters 164a to 164k has the same configuration as the notch filter 164 shown in FIG. 8, and removes the external noise that corresponds to the notch frequency set in accordance with the discretization signal output from the frequency converting unit 104.

For example, by the configuration shown in FIG. 10, even when a plurality of single frequency noises or narrowband noises (external noises) where a noise band is narrow are included in the discretization signal output from the frequency converting unit 104, the noise removing unit 180 according to the modification of the first embodiment can remove the plurality of external noises.

The communication device according to the modification of the first embodiment includes, for example, the noise removing unit 180 shown in FIG. 10. As a result, even when the plurality of single frequency noises or narrowband noises (external noises) where a noise band is narrow are included in the discretization signal output from the frequency converting unit 104, the communication device can remove the plurality of external noises. Accordingly, the communication device according to the modification of the first embodiment can remove a large amount of external noises, as compared with the communication device 100 according to the first embodiment shown in FIGS. 6 and 7.

Further, in the communication device according to the modification of the first embodiment, the configuration of the noise removing unit is different from that of the noise removing unit in the communication device 100 according to the first embodiment shown in FIGS. 6 and 7. However, the communication device according to the modification of the first embodiment can detect a plurality of external noises without performing a feedback operation on the discretization signal, and remove the plurality of external noises. Accordingly, the communication device according to the modification of the first embodiment can achieve the same effect as the communication device 100 according to the first embodiment.

(Program According to a First Embodiment)

The external noise can be stably removed from the transmission signal where the spectrum spread signal is modulated, by using a program that allows a computer to function as the noise removing unit 106 of the communication device 100 according to the first embodiment.

(Noise Removing Method According to a First Embodiment)

Next, a noise removing method according to the first embodiment will be described. FIG. 11 is a flowchart illustrating a noise removing method according to a first embodiment of the present invention. In the description below, the noise removing method shown in FIG. 11 is executed by the communication device 100 (specifically, noise removing unit 106).

The communication device 100 performs a fast Fourier transform on the discretization signal (S100). In this case, the communication device 100 can periodically or randomly execute a process of Step S100. Further, the process may be executed whenever the discretization signal is input.

Based on a result of the fast Fourier transform in Step S100, the communication device 100 detects apeak frequency (S102). In this case, the communication device 100 detects, for example, a frequency having maximum amplitude as a peak frequency among frequencies having amplitude of a predetermined value or more, based on the result of the fast Fourier transform, but the present invention is not limited thereto.

Based on the peak frequency that is detected in Step S102, the communication device 100 outputs a discretization signal where a frequency component corresponding to the peak frequency is attenuated (S104). In this case, the communication device 100 includes the notch filter as the noise removing unit, and can execute the process of Step S104 by setting the peak frequency detected in Step S102 as the notch frequency of the notch filter.

Using the method shown in FIG. 11, the communication device 100 can detect the external noise without performing a feedback operation on the discretization signal, based on the discretization signal having the possibility of including the external noise, and output the discretization signal where the external noise is removed.

(Second Embodiment)

Figure 12:
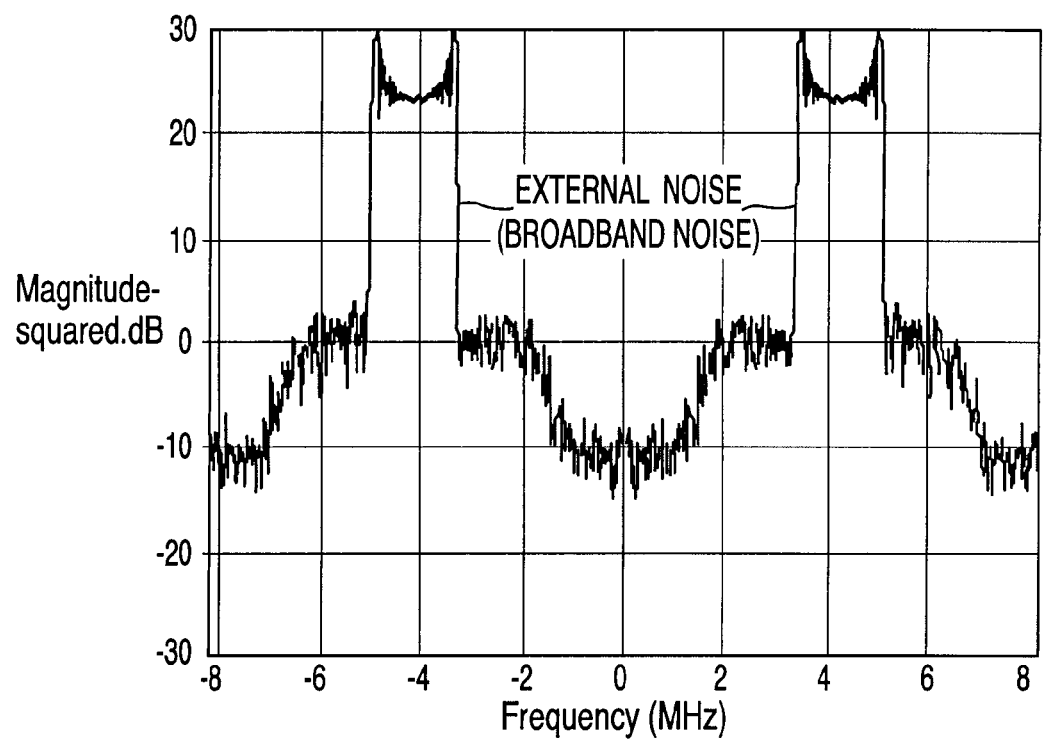
FIG. 12 is a diagram illustrating another example of a discretization signal that includes an external noise.

In the above case, as the communication device according to the first embodiment of the present invention, the description has been given to the communication device 100 including the noise removing unit that mainly removes a single frequency noise (external noise) or a narrowband noise (external noise) shown in FIG. 2. However, the external noise that is removed by the communication device according to the embodiment of the present invention is not limited to the noise of the single frequency or the narrowband noise shown in FIG. 2. For example, the communication device according to the embodiment of the present invention can remove a broadband noise having a broad noise band that is shown in FIG. 12 (external noise. Here, FIG. 12 shows an FM wave). Accordingly, as a communication device according to a second embodiment of the present invention, the description is given to a communication device that includes a noise removing unit that can remove the broadband noise (external noise).

[Noise Removing Approach According to a Second Embodiment]

When the communication device according to the embodiment of the present invention communicates with the GPS satellite (external device), S/(N+1) becomes significantly smaller than 0 [dB]. Further, in power of a discretization signal in an ideal state (hereinafter, referred to as "ideal discretization signal") where the external noise is not included, a thermal noise approximates to 100%, and a statistical property of the thermal noise itself is constant.

Further, if the ideal discretization signal is set as x(t), the external noise is set as n(t), and the discretization signal based on the received transmission signal is set as y(t), a relationship between the discretization signal y(t), the ideal discretization signal x(t), and the external noise n(t) is represented by the following Equation 3.

$$y(t)=x(t)+n(t) \quad \text{[Equation 3]}$$

Accordingly, the communication device according to the second embodiment uses a Wiener filter that minimizes a minimum mean squared error to obtain a discretization signal x'(t) where a mean squared error of the ideal discretization signal x(t) represented in Equation 3 is minimized, thereby removing an external noise from the discretization signal y(t). In this case, the communication device according to the second embodiment uses the results Y(f), X(f), and N(f) that are obtained by performing a Fourier transform on the discretization signal y(t), the ideal discretization signal x(t), and the external noise n(t), and the power spectrums Py(f), Px(f, and Pn(f), thereby obtaining the discretization signal x'(t), which will be specifically described below.

Since the ideal discretization signal x(t) mainly includes a thermal noise, if dispersion of amplitude is assumed as $\sigma x^2$, $\sigma x^2$ becomes a constant value without depending on a frequency. Accordingly, the power spectrum Px(f) of the ideal discretization signal x(t) can be approximately represented by the following Equation 4. In this case, AF denotes a bandwidth (for example, 2 MHz) of the discretization signal. Further, $\sigma x^2$ can be determined, for example, by observing the same signal as a transmission signal in a state where the communication antenna is not connected, but the present invention is not limited thereto. That is, Px(f) in Equation 4 denotes power per unit frequency (for example, 1 MHz). In the description below, since the power spectrum Px(f) of the ideal discretization signal x(t) denotes power per unit frequency, the power spectrum Px(f) may be referred to as "reference power".

$$Px(f)=\sigma x^2/\Delta F \quad \text{[Equation 4]}$$

In addition, the power spectrum Pn(f) of the external noise can be represented by the following Equation 5 from Equation 3.

$$Pn(f)=Py(f)-Px(f) \quad \text{[Equation 5]}$$

Further, if Equations 4 and 5 and Wiener filter logic are applied, a result W(f) of a Fourier transform of the Wiener filter can be represented by the following Equation 6.

$$W(f) = 1/\{1 + Pn(f)/Px(f)\} \quad \text{[Equation 6]}$$
$$= Px(f)/Py(f)$$

The communication device according to the second embodiment uses a fast Fourier transforming circuit where a point number $N_{FET}$ is set, for example, as power-of-two, thereby previously setting the reference power Px(n) by Equation 7, based on Equation 4.

$$Px(n)=\sigma x^2/\Delta f \quad \text{[Equation 7]}$$

The communication device according to the second embodiment uses the fast Fourier transforming circuit where a point number NIFET is set, for example, as power-of-two, thereby obtaining a power spectrum of the discretization signal y(t) based on the discretization signal y(t) from the following Equation 8. In this case, in Equation 8, n is an integer of n=0 to $N_{FET}-1$, and $N_{FET}^2$ denotes a correction coefficient that corrects an output of the fast Fourier transforming circuit using a point number. Further, in Equation 8, $\Delta f$ denotes a resolution of the fast Fourier transforming circuit. If a sampling frequency Fs is used, $\Delta f$ is represented as $\Delta f=Fs/N_{FET}$. For Example, when it is assumed that the sampling frequency Fs is 16 [MHz] and the point number $N_{FET}$ is 64, $\Delta f$ becomes 250 [kHz].

$$Py(n)=Y(n)^2/N_{FET}^2/\Delta f \qquad \text{[Equation 8]}$$

The communication device according to the second embodiment uses the Wiener filter that has a relationship represented in Equation 6, thereby obtaining a discretization signal x'(t) where a mean squared error of the ideal discretization signal x(t) is minimized, based on the discretization signal y(t) (specifically, Py(n) represented in Equation 8). Further, the communication device according to the second embodiment does not need to perform a feedback operation on the discretization signal y(t) in order to detect the external noise, as in the communication device 10 according to the related art. Accordingly, the communication device according to the second embodiment can detect the external noise without performing a feedback operation on the discretization signal y(t) and remove the external noise from the discretization signal y(t).

The communication device 100 according to the first embodiment uses a notch filter that applies rapid attenuation to a specific frequency (notch frequency) and removes an external noise. Thus, the communication device 100 is suitable, for example, for mainly removing a single frequency noise or a narrowband noise (external noise) where a noise band is narrow. Meanwhile, since the communication device according to the second embodiment uses the Wiener filter as a type of adaptive filter to remove the external noise, it is possible to effectively remove not only the noise of the single frequency or the narrowband noise where the noise band is narrow but also a biased broadband noise where a frequency is temporally varied, which is shown in FIG. 12.

Further, in the above case, logic of the Wiener filter in the frequency region is applied as the noise removing approach according to the second embodiment, but the noise removing approach in the communication device according to the second embodiment is not limited thereto. For example, the communication device according to the second embodiment can remove the broadband noise by using a method that adaptively controls coefficients of a finite impulse response (FIR) filter and a finite impulse response tap, by a Wiener-hoff equation that is a solution in a time domain.

Hereinafter, the communication device 200 according to the second embodiment of the present invention will be described. In this case, the communication device 200 and the communication device 100 according to the first embodiment are different from each other in a noise removing approach. Accordingly, the communication device 200 is different from the communication device 100 in the configuration of the noise removing unit that removes the external noise, but the other configuration thereof is the same as the configuration of the communication device 100. Accordingly, in the description below, the configuration of a noise removing unit 202 of the communication device 200 is described and the other configuration is not described.

[Example of the Configuration of a Noise Removing Unit 202]

Figure 13:
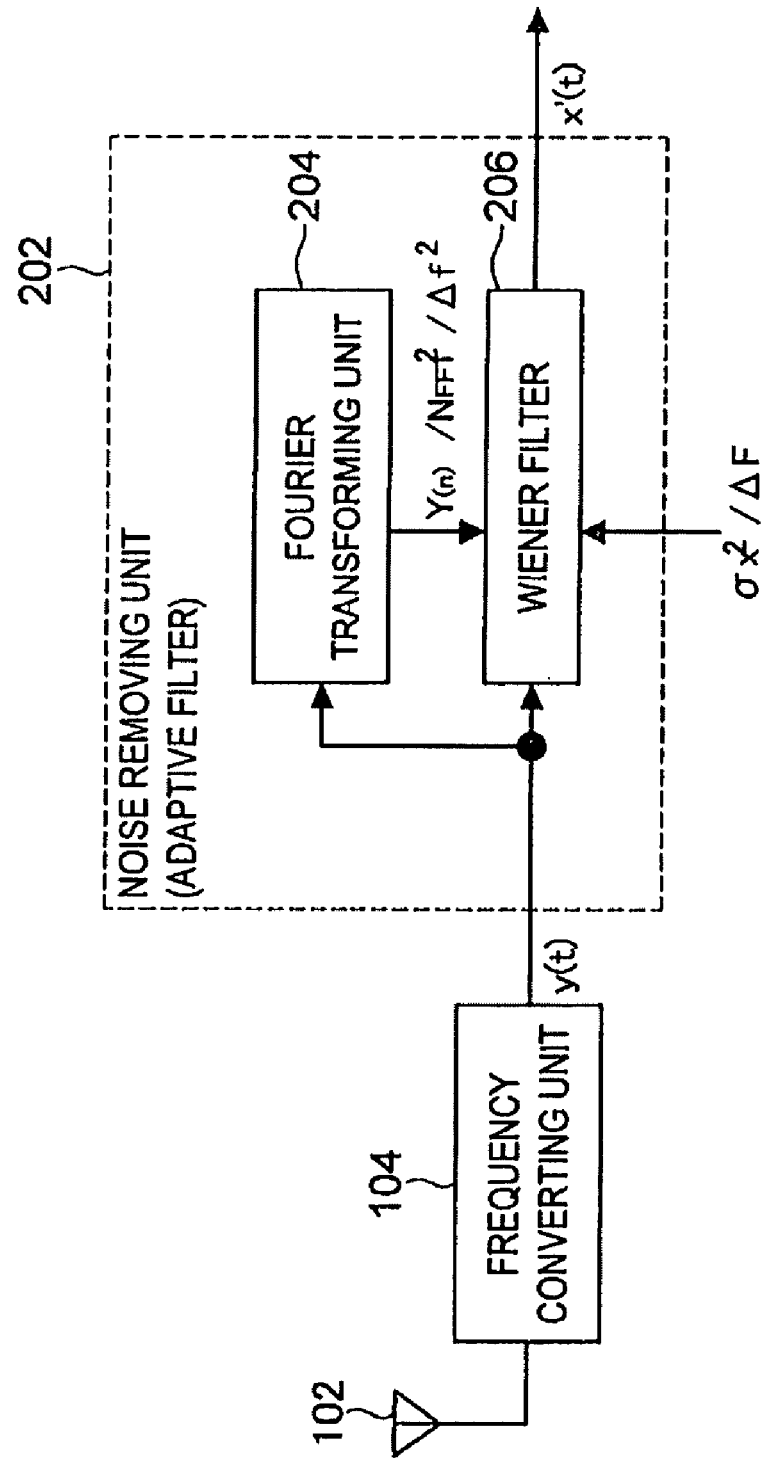
FIG. 13 is a diagram illustrating an example of the configuration of a noise removing unit according to a second embodiment of the present invention.

FIG. 13 is a diagram illustrating an example of the configuration of a noise removing unit 202 according to a second embodiment of the present invention. In this case, in FIG. 13, the communication antenna 102 and the frequency converting unit 104 are shown together. Further, in FIG. 13, a discretization signal that has the possibility of including the external noise output from the frequency converting unit 104 is shown as a discretization signal y(t) and the discretization signal after removing the noise is shown as a discretization signal x'(t). In this case, the discretization signal x'(t) that is output from the noise removing unit 202 is transmitted to the demodulating unit 108.

Referring to FIG. 13, the noise removing unit 202 that functions as an adaptive filter includes a Fourier transforming unit 204 (second Fourier transforming unit) and a Wiener filter 206 (first Wiener filter).

The Fourier transforming unit 204 performs a fast Fourier transform on the discretization signal y(t) output from the A/D converter 128 of the frequency converting unit 104, and derives a power spectrum $Py(n)=Y(n)^2/N_{FET}^2/\Delta f$ based on the result Y(n) of the fast Fourier transform and outputs the power spectrum. In this case, the Fourier transforming unit 204 can include, for example, a fast Fourier transforming circuit, and an operation circuit that derives the power spectrum Py(n) based on the result of the fast Fourier transform, but the present invention is not limited thereto. Further, in the communication device 200, based on the result of the fast Fourier transform in the Fourier transforming unit 204, for example, the MPU 144 of the demodulating unit 108 or the control unit (not shown) can derive the power spectrum Py(n).

The Wiener filter 206 outputs the discretization signal x'(t) where a mean squared error of the ideal discretization signal x(t) is minimized, based on the discretization signal y(t) output from the A/D converter 128, the power spectrum Py(n) output from the Fourier transforming unit 204, and the reference power Px(n). In this case, a value of the reference power Px(n) is transmitted, for example, by the MPU 144 of the demodulating unit 108 or the control unit (not shown), but the present invention is not limited thereto.

By the configuration that is shown in FIG. 13, for example, the noise removing unit 202 can output the discretization signal x'(t) where a mean squared error of the ideal discretization signal x(t) is minimized, that is, the discretization signal where the external noise is removed, based on the discretization signal y(t) output from the A/D converter 128.

As described above, the communication device 200 according to the second embodiment of the present invention basically has the same configuration as the communication device 100 according to the first embodiment shown in FIG. 6, receives the transmission signal transmitted from the external device, detects the spectrum spread signal included in the received transmission signal, and demodulates the spectrum spread signal. Further, the communication device 200 has the Wiener filter, and includes the noise removing unit 202 that functions, for example, as the adaptive filter to remove the narrowband noise or the noise of the single frequency (external noise) shown in FIG. 2, or the broadband noise (external noise) shown in FIG. 12. The noise removing unit 202 outputs the discretization signal where the mean squared error of the ideal discretization signal is minimized, that is, the discretization signal where the external noise is removed, based on the discretization signal transmitted from the A/D converter 128, the power spectrum based on the result of the fast Fourier transform with respect to the discretization signal, and the power spectrum of the ideal discretization signal. In this case, since the noise removing unit 202 does not need to perform a feedback operation on the discretization signal in order to detect the external noise, the communication device does not perform an unstable operation, as in the communication device 10 according to the related art. Accordingly, the communication device 200 can stably remove the external noise from the transmission signal where the spectrum spread signal is modulated. Further, since the communication device 200 can stably remove the external noise, the communication device 200 can surely demodulate the spectrum spread signal.

Further, similar to the communication device 100 according to the first embodiment, in the communication device 200, the A/D converter 128 that is provided at the final stage of the analog circuit to process an analog signal is composed of an A/D converter that has a resolution of N bits that are larger than the number of bits corresponding to average amplitude of a normal thermal noise. In addition, the A/D converter 128 sets the average amplitude of the normal thermal noise as lower M bits of the A/D converter 128. Accordingly, the A/D converter 128 that is included in the communication device 200 can prevent the output spectrum of the A/D converter from being saturated due to the external noise, and surely remove the external noise in the noise removing unit 202 that is provided at the rear stage of the A/D converter 128.

(Program According to a Second Embodiment)

The external noise can be stably removed from the transmission signal where the spectrum spread signal is modulated, by using a program that allows a computer to function as the noise removing unit 202 of the communication device 200 according to the second embodiment.

(Noise Removing Method According to a Second Embodiment)

Figure 14:
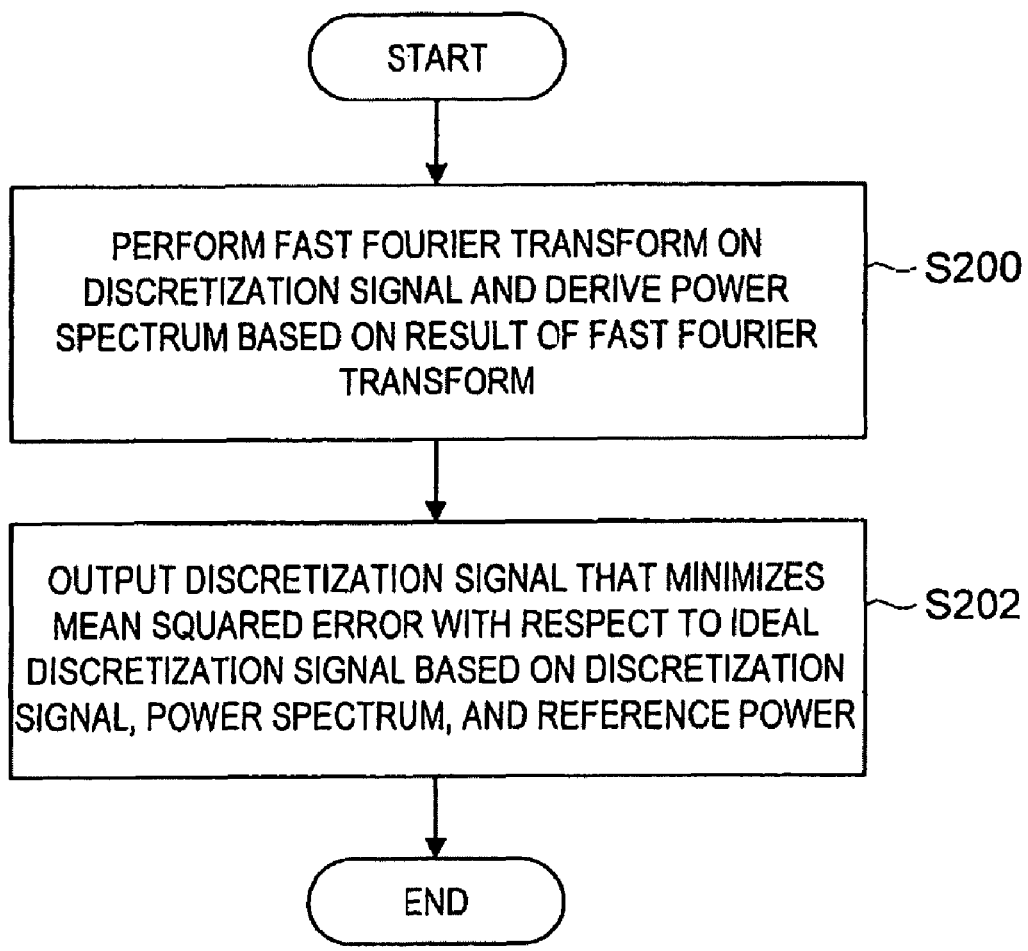
FIG. 14 is a flowchart illustrating a noise removing method according to a second embodiment of the present invention.

Next, a noise removing method according to a second embodiment will be described. FIG. 14 is a flowchart illustrating a noise removing method according to a second embodiment of the present invention. In the description below, the noise removing method shown in FIG. 14 is executed by the communication device 200 (specifically, noise removing unit 202).

The communication device 200 performs a fast Fourier transform on the discretization signal, and derives a power spectrum based on the result of the fast Fourier transform (S200).

If the power spectrum is derived in Step S200, the communication device 200 outputs a discretization signal where a mean squared error with respect to an ideal discretization signal is minimized, based on the discretization signal, the power spectrum derived in Step S200, and the reference power (S202). In this case, the communication device 200 includes the Wiener filter as the noise removing unit, thereby executing a process of Step S202.

Using the method shown in FIG. 14, the communication device 200 can detect the external noise without performing a feedback operation on the discretization signal, based on the discretization signal having the possibility of including the external noise, and output the discretization signal where the external noise is removed.

(Third Embodiment)

In the above case, as the communication device according to the second embodiment of the present invention, the description has been given to the communication device 200 including the noise removing unit 202 that functions as the adaptive filter capable of removing a broadband noise and has the Wiener filter. However, the configuration of the noise removing unit that is included by the communication device according to the embodiment of the present invention and can remove the broadband noise is not limited to the configuration of the noise removing unit 202 shown in FIG. 13. Accordingly, a communication device 300 according to a third embodiment of the present invention that is another embodiment of the communication device that includes the noise removing unit capable of removing a broadband noise will be described.

In this case, the communication device 300 and the communication device 200 according to the second embodiment are different from each other in the configuration of the noise removing unit, and the other configuration thereof is the same as the configurations of the communication device 100 according to the first embodiment and the communication device 200 according to the second embodiment. Accordingly, in the description below, the configuration of a noise removing unit 302 of the communication device 300 is described and the other configuration is not described.

[Example of the Configuration of a Noise Removing Unit 302]

Figure 15:
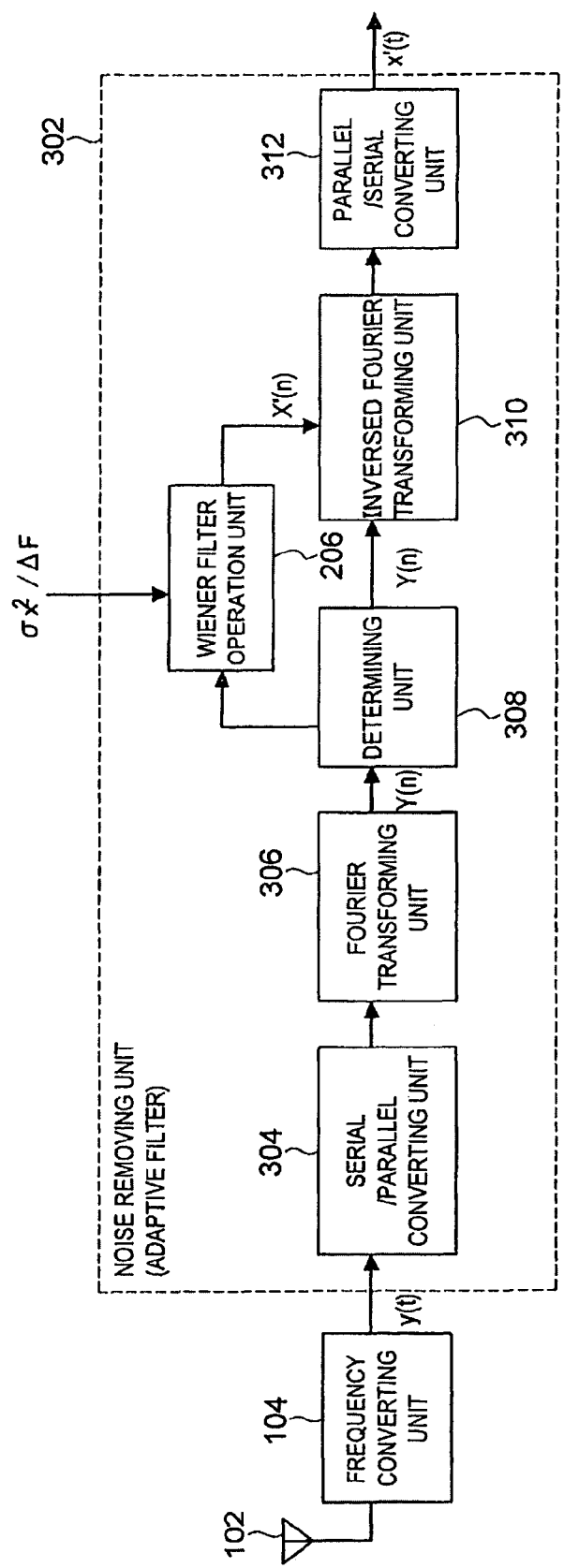
FIG. 15 is a diagram illustrating an example of the configuration of a noise removing unit according to a third embodiment of the present invention.

FIG. 15 is a diagram illustrating an example of the configuration of a noise removing unit 302 according to a third embodiment of the present invention. In this case, in FIG. 15, the communication antenna 102 and the frequency converting unit 104 are shown together. Further, in FIG. 15, a discretization signal that has the possibility of including an external noise output from the frequency converting unit 104 is shown as a discretization signal y(t) and the discretization signal after removing the noise is shown as a discretization signal x'(t). In this case, the discretization signal x'(t) that is output from the noise removing unit 502 is transmitted to the demodulating unit 108.

Referring to FIG. 15, the noise removing unit 302 includes a serial/parallel converting unit 304, a Fourier transforming unit 306 (third Fourier transforming unit), a determining unit 308 (first determining unit), a Wiener filter 206 (hereinafter, it may also be referred to as a "Wiener filter operation unit 206"; second Wiener filter), an inversed Fourier transforming unit 310, and a parallel/serial converting unit 312.

The serial/parallel converting unit 304 converts the discretization signal y(t) output from the A/D converter 128 of the frequency converting unit 104 from serial data to parallel data. In this case, the serial/parallel converting unit 304 can be configured, for example, by using a shift register, but the present invention is not limited thereto. Further, when the discretization signal y(t) is parallel data, the serial/parallel converting unit 304 does not execute a converting process.

The Fourier transforming unit 306 performs a fast Fourier transform on a discretization signal y(t), which is output from the serial/parallel converting unit 304 and converted into parallel data.

The determining unit 308 derives a power spectrum $Py(n) = Y(n)^2/N_{FET}^2/\Delta f$ of the discretization signal, based on the result Y(n) of the fast Fourier transform transmitted from the Fourier transforming unit 306. In addition, the determining unit 308 compares the magnitudes of the derived power spectrum Py(n) and the reference power Px(n) and selectively changes an output destination of the result Y(n) of the fast Fourier transform in accordance with the compared result.

[1] Case of Py(n)>Px(n)

When the magnitude of the power spectrum Py(n) is larger than the magnitude of the reference power Px(n), this means that the external noise is included in the discretization signal y(t). Accordingly, in the above case, the determining unit 308 outputs the result Y(n) of the fast Fourier transform and the power spectrum Py(n) to the Wiener filter operation unit 206.

[2] Case of Py(n)≦Px(n)

When the magnitude of the power spectrum Py(n) is smaller than or equal to the magnitude of the reference power Px(n), this means that the possibility of including the external noise in the discretization signal y(t) is low and a level of the external noise is not higher than a level of the thermal noise. Thus, the possibility of causing an issue in the demodulation of the spectrum signal is low. Accordingly, in the above case, the determining unit 308 outputs the result Y(n) of the fast Fourier transform to the inversed Fourier transforming unit 310, not the Wiener filter operation unit 206 that removes the external noise.

In this case, the determining unit 308 can be configured, for example, by using an operation circuit that derives the power spectrum Py(n) based on the result Y(n) of the fast Fourier transform or a digital comparator that compares the reference power Px(n) and the power spectrum Py(n), but the present invention is not limited thereto.

When the result Y(n) of the fast Fourier transform and the power spectrum Py(n) are transmitted from the determining unit 308, the Wiener filter operation unit 206 performs an operation shown in the following Equation 9, and outputs the fast Fourier transformed result X'(n) that corresponds to the discretization signal x'(t) where a mean squared error of the ideal discretization signal x(t) is minimized. In this case, the Wiener filter operation unit 206 can have the same configuration as the Wiener filter operation unit 206 according to the second embodiment shown in FIG. 13.

$$X'(n)=W(n)\cdot Y(n)=Y(n)\cdot\{Px(n)/Py(n)\} \quad \text{[Equation 9]}$$

The inversed Fourier transforming unit 310 performs an inversed fast Fourier transform (hereinafter, it may also be referred to as an "IFFT") with respect to the result Y(n) of the fast Fourier transform output from the determining unit 308 or the fast Fourier transformed result X'(n) output from the Wiener filter operation unit 206. In this case, the result Y(n) of the fast Fourier transform output from the determining unit 308 to the inversed Fourier transforming unit 310 corresponds to the discretization signal where the possibility of including the external noise is low, and the fast Fourier transformed result X'(n) output from the Wiener filter operation unit 206 corresponds to the discretization signal where the external noise is removed in the Wiener filter operation unit 206. Accordingly, the inversed Fourier transforming unit 310 outputs the same discretization signal as the ideal discretization signal or a discretization signal that includes an external noise to a degree to which the discretization signal can be regarded as the same signal as the ideal discretization signal.

By the configuration shown in FIG. 15, for example, the noise removing unit 302 can output the discretization signal where the external noise is removed (or the external noise is not included), based on the discretization signal y(t) that is output from the A/D converter 128. Accordingly, the noise removing unit 302 can function as an adaptive filter that can remove the external noise.

Figure 16A:
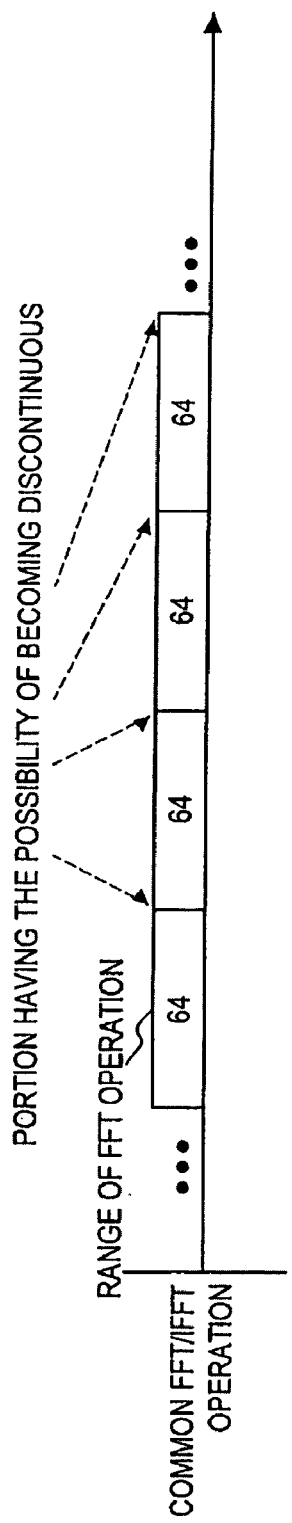
FIG. 16A is a diagram illustrating an example of a fast Fourier transform process and an inversed fast Fourier transform process in a noise removing unit according to a third embodiment of the present invention.

Further, as shown in FIG. 15, the noise removing unit 302 includes the Fourier transforming unit 306 and the inversed Fourier transforming unit 310, and performs the fast Fourier transform (FFT) and the inversed fast Fourier transform (IFFT). In this case, for example, when the Fourier transforming unit 306 and the inversed Fourier transforming unit 310 each include a fast Fourier transforming unit where the point number $N_{FET}$ is set as 64, each fast Fourier transforming circuit operates the discretization signals y(t) for every 64 signals. At this time, as shown in FIG. 16A for example, if the operation is simply performed for every 64 signals, due to a cyclic property of the fast Fourier transform (FFT) and the inversed fast Fourier transform (IFFT), jointed signals for every 64 signals may become significantly discontinuous. As described above, when the signals become significantly discontinuous, a discontinuous portion of the signals becomes a new noise.

Figure 16B:
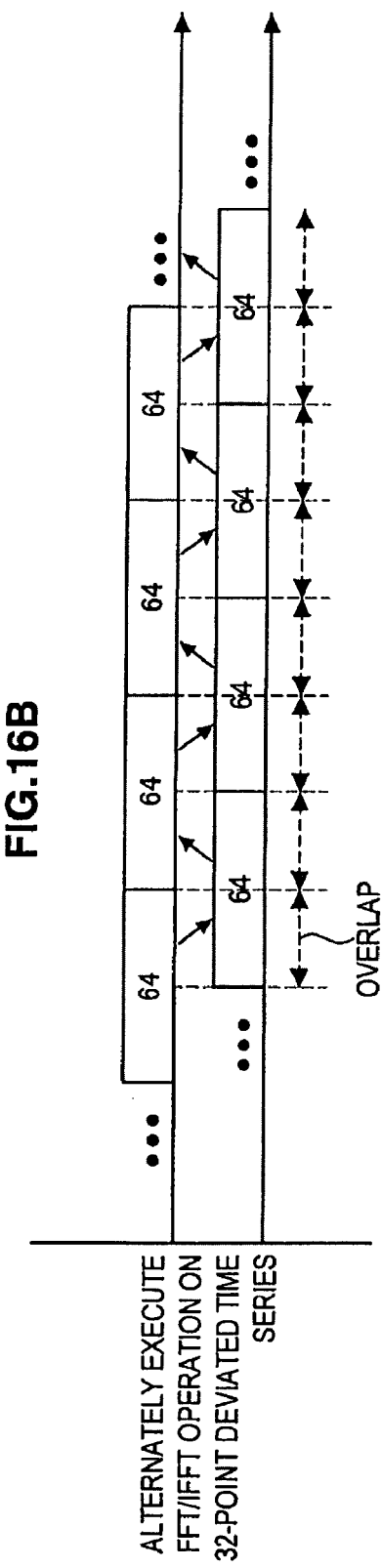
FIG. 16B is a diagram illustrating an example of a fast Fourier transform process and an inversed fast Fourier transform process in a noise removing unit according to a third embodiment of the present invention.

Accordingly, as shown in FIG. 16B for example, in the noise removing unit 302, the Fourier transforming unit 306 overlaps the discretization signals y(t) in the fast Fourier transforming circuit where the point number $N_{FET}$ is set as 64 by 64/2=32 and performs a fast Fourier transform (FFT) on the signals. In addition, the inversed Fourier transforming unit 310 executes a smoothing process that outputs only approximately central 32 signals among 64 signals as the result x'(t) of the inversed fast Fourier transform (IFFT), in the fast Fourier transforming circuit where the point number $N_{FET}$ is set as 64.

Since the noise removing unit 302 can hold continuity of signals by operating the Fourier transforming unit 306 and the inversed Fourier transforming unit 310 as described above, it is possible to prevent discontinuity of signals from being generated in the fast Fourier transform (FFT) and the inversed fast Fourier transform (IFFT), that is, a new noise from being generated. Further, the fast Fourier transforming process and the inversed fast Fourier transforming process in the noise removing unit according to the third embodiment of the present invention are not limited to the above examples. For example, the noise removing unit according to the third embodiment of the present invention can execute a fast Fourier transforming process and an inversed fast Fourier transforming process, as shown in FIG. 16A.

As described above, the communication device 300 according to the third embodiment of the present invention basically has the same configuration as the communication device 100 according to the first embodiment shown in FIG. 6, and receives the transmission signal transmitted from the external device, detects the spectrum spread signal included in the received transmission signal, and demodulates the spectrum spread signal. Further, the communication device 300 includes the noise removing unit 302 that determines a degree to which the external noise is included based on the discretization signal and selectively removes the external noise in accordance with the determined result. In this case, similar to the noise removing unit 202 according to the second embodiment shown in FIG. 13, the noise removing unit 302 uses the Wiener filter to remove the external noise. That is, since the noise removing unit 302 does not need to perform a feedback operation on the discretization signal in order to detect the external noise, the communication device does not perform an unstable operation, as in the communication device 10 according to the related art. Accordingly, the communication device 300 can stably remove the external noise from the transmission signal where the spectrum spread signal is modulated. Further, since the communication device 300 can stably remove the external noise, the communication device 300 can surely demodulate the spectrum spread signal.

Further, similar to the communication device 100 according to the first embodiment, in the communication device 300, the A/D converter 128 that is provided at the final stage of the analog circuit to process an analog signal is composed of an A/D converter that has a resolution of N bits that are larger than the number of bits corresponding to average amplitude of a normal thermal noise. In addition, the A/D converter 128 sets the average amplitude of the normal thermal noise as lower M bits of the A/D converter 128. Accordingly, the A/D converter 128 that is included in the communication device 300 can prevent the output spectrum of the A/D converter from being saturated due to the external noise, and surely remove the external noise in the noise removing unit 302 that is provided at the rear stage of the A/D converter 128.

(Program According to a Third Embodiment)

The external noise can be stably removed from the transmission signal where the spectrum spread signal is modulated, by using a program that allows a computer to function as the noise removing unit 302 of the communication device 300 according to the third embodiment.

(Noise Removing Method According to a Third Embodiment)

Figure 17:
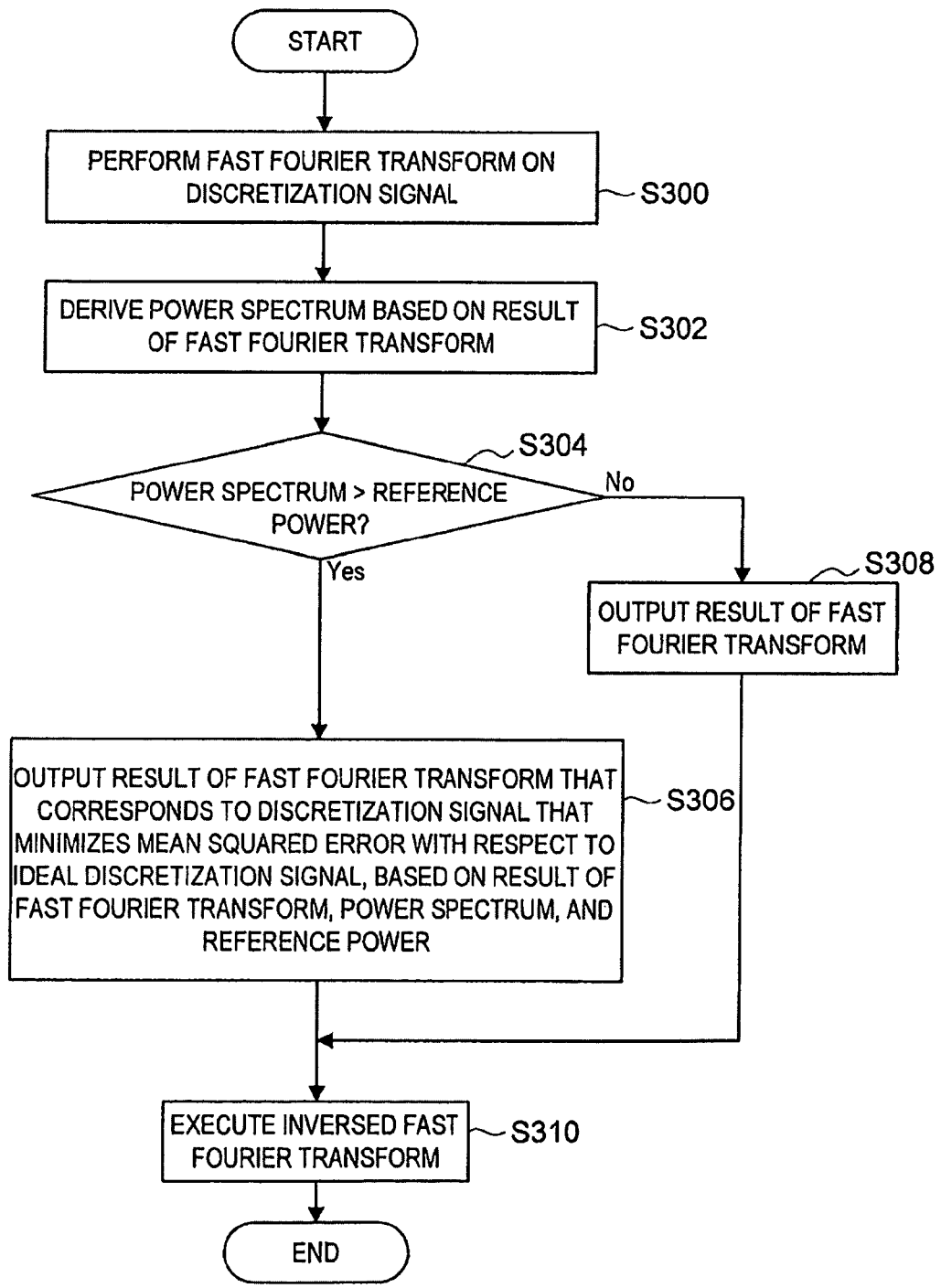
FIG. 17 is a flowchart illustrating a noise removing method according to a third embodiment of the present invention.

Next, a noise removing method according to a third embodiment will be described. FIG. 17 is a flowchart illustrating a noise removing method according to a third embodiment of the present invention. In the description below, the noise removing method shown in FIG. 17 is executed by the communication device 300 (specifically, noise removing unit 302).

Similar to Step S100 of FIG. 11, the communication device 300 performs a fast Fourier transform on the discretization signal y(t) (S300). In addition, similar to Step S200 of FIG. 14, the communication device 300 derives a power spectrum Py(n) based on the result Y(n) of the fast Fourier transform in Step S300 (S302).

If the power spectrum Py(n) is derived in Step S302, the communication device 300 determines whether the power spectrum Py(n) derived in Step S302 is larger than the reference power Px(n) (S304).

When it is determined that the power spectrum Py(n) is larger than the reference power Px(n) in Step S304, the communication device 300 outputs the result X'(n) of the fast Fourier transform that corresponds to the discretization signal that minimizes a mean squared error with respect to the ideal discretization signal, based on the result Y(n) of the fast Fourier transform in Step S300, the power spectrum Py(n) derived in Step S302, and the reference power Px(n) (S306). In this case, the communication device 300 includes the noise removing unit that has a Wiener filter operation function, thereby executing the process of Step S306.

If the result X'(n) of the fast Fourier transform is output in Step S306, the communication device 300 performs an inversed Fourier transform on the result X'(n) of the fast Fourier transform (S310). In the above case, the communication device 3Q0 can output the discretization signal x'(t) that minimizes a mean squared error with respect to the ideal discretization signal.

Further, when it is determined in Step S304 that the power spectrum Py(n) is not larger than the reference power Px(n), the communication device 300 outputs the result Y(n) of the fast Fourier transform in Step S300 (S308). In addition, the communication device 300 performs an inversed Fourier transform on the result Y(n) of the fast Fourier transform (S310). In the above case, the communication device 300 can output the discretization signal x'(t) that does not include an external noise.

Using the method shown in FIG. 17, the communication device 300 can detect the external noise without performing a feedback operation on the discretization signal, based on the discretization signal having the possibility of including the external noise, and output the discretization signal where the external noise is removed.

(Fourth Embodiment)

In the above case, as the communication devices according to the second and third embodiments of the present invention, the description has been given to the communication devices including the noise removing unit that has the Fourier transforming unit or the inversed Fourier transforming unit, thereby removing the broadband noise. However, the configuration of the noise removing unit that is included in the communication device according to the embodiment of the present invention and can remove the broadband noise is not limited to the configuration that has the Fourier transforming unit or the inversed Fourier transforming unit, as shown in FIG. 13 or FIG. 15. Accordingly, as a communication device according to the fourth embodiment, a communication device 400 including a noise removing unit 402 that can remove a broadband noise without using a fast Fourier transform will be described.

[Noise Removing Approach According to a Fourth Embodiment]

In the noise removing unit 302 that performs a fast Fourier transform (FFT) and an inversed fast Fourier transform (IFFT) shown in FIG. 15, if a sampling frequency is set as Fs, frequencies from −Fs/2 to Fs/2 (for example, in the case of Fs=16 MHz, −8 MHz to 8 MHz) are equally handled. However, in the communication device according to the embodiment of the present invention, as shown in FIG. 6 for example, in the frequency converting unit 104, a band is restricted in the various filters, such as the BPF 130 or BPF 126. In this case, when the communication device according to the embodiment of the present invention receives a GPS signal, as a representative example of a signal band of an IF signal in the case where an intermediate frequency is zero, a band of −2 MHz to 2 MHz is exemplified. Accordingly, in the communication device according to the embodiment of the present invention, if a Wiener filter operation shown in Equation 9 is performed, for example, with respect to all the frequencies in a range of −Fs/2 to Fs/2, this corresponds to an overspec.

Accordingly, if the communication device according to the embodiment of the present invention performs the Wiener filter operation by a portion that corresponds to the IF signal band among −Fs/2 to Fs/2, the process can be efficiently executed. However, even in the above case, since the point number $N_{FET}$ of the fast Fourier transforming circuit that is included in the noise removing unit does not vary, an operation amount in the fast Fourier transforming circuit does not greatly vary. Further, when an overlapping process is executed to prevent discontinuity due to circularity in the inversed fast Fourier transform (IFFT) and the fast Fourier transform (FFT) shown in FIG. 16B, the operation amount in the fast Fourier transforming circuit may be further increased.

Accordingly, the communication device 400 according to the fourth embodiment of the present invention includes a noise removing unit 402 that has a plurality of BPFs whose central frequencies are different from each other by the amount that can cover an IF signal band and performs a Wiener filter operation on each output of the BPFs. In this case, the noise removing unit 402 uses, for example, a frequency sampling filter as the configuration that has the plurality of BPFs whose central frequencies are different from each other. By the above configuration, the communication device 400 can include the noise removing unit 402 that includes minimum components needed to demodulate a targeted spectrum spread signal. Further, since the communication device 400 removes an external noise without using the fast Fourier transforming circuit, it is possible to reduce a circuit scale of the noise removing unit, as compared with the configuration using the fast Fourier transforming circuit. Further, it is possible to prevent the discontinuity from being generated due to the circularity in the fast Fourier transform (FFT) and the inversed fast Fourier transform (IFFT).

Hereinafter, the configuration of the communication device 400 according to the fourth embodiment of the present invention will be described. In this case, the communication device 400 is different from the communication devices according to the second and third embodiments in the configuration of the noise removing unit, but the other configuration thereof is the same as the configurations of the communication devices according to the first to third embodiments. Accordingly, in the description below, the configuration of the noise removing unit 402 of the communication device 400 is described and the other configuration thereof is not described.

[Example of the Configuration of a Noise Removing Unit 402]

Figure 18:
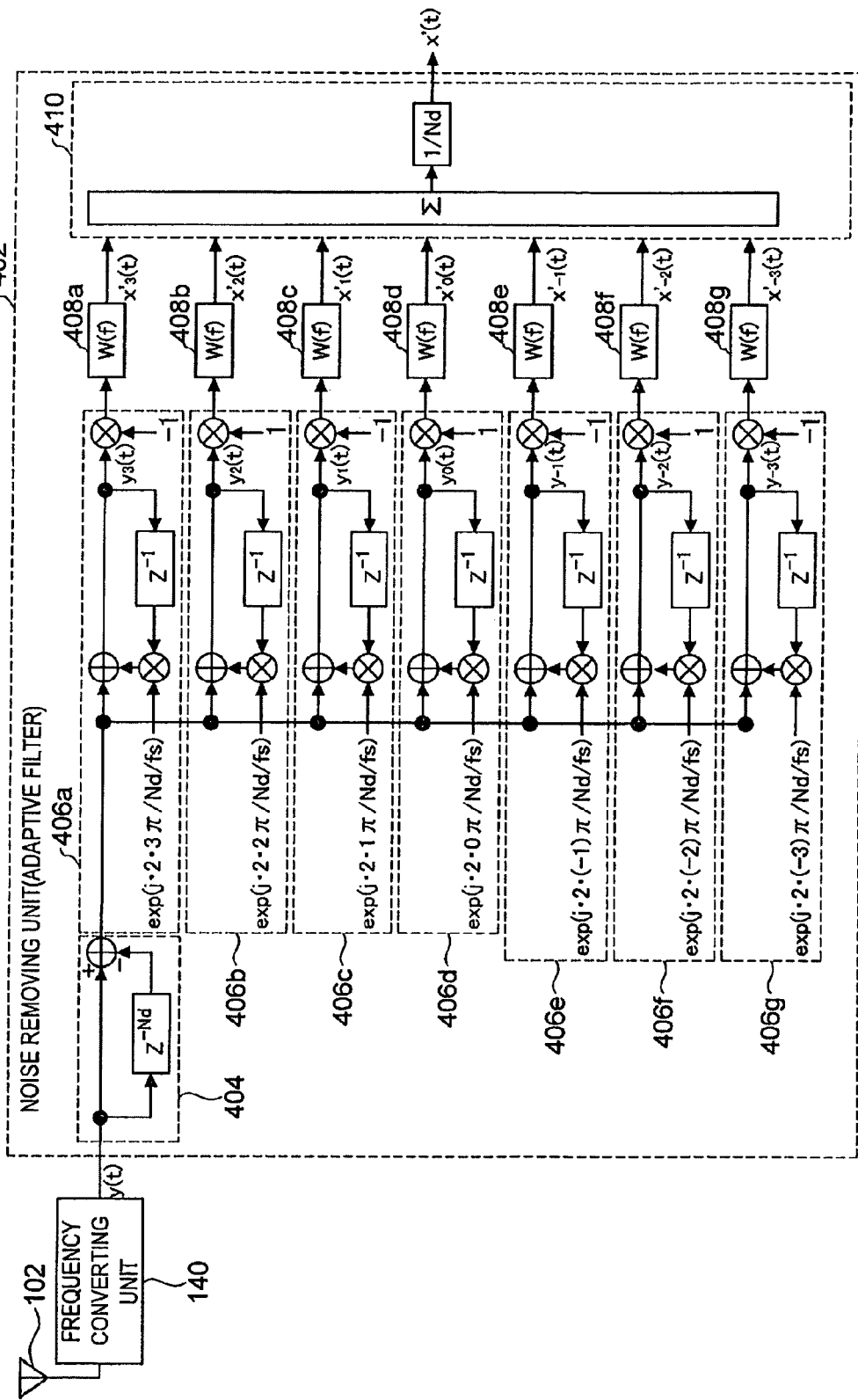
FIG. 18 is a diagram illustrating an example of the configuration of a noise removing unit according to a fourth embodiment of the present invention.

FIG. 18 is a diagram illustrating an example of the configuration of a noise removing unit 402 according to a fourth embodiment of the present invention. In this case, in FIG. 18, the communication antenna 102 and the frequency converting unit 104 are shown together. Further, in FIG. 18, a discretization signal that has the possibility of including an external noise output from the frequency converting unit 104 is shown as a discretization signal y(t) and the discretization signal after removing the noise is shown as a discretization signal x'(t). In this case, the discretization signal x'(t) that is output from the noise removing unit 502 is transmitted to the demodulating unit 108.

Referring to FIG. 18, the noise removing unit 402 includes a BPF common unit 404, BPF individual units 406a to 406g, adaptive filters 408a to 408g (second adaptive filters), and a synthesizing unit 410.

In this case, in the noise removing unit 402, the BPF common unit 404, the BPF individual units 406a to 406g, and the synthesizing unit 410 constitute a frequency sampling filter. Further, the BPF common unit 404 and the BPF individual unit 406a constitute one BPF. In the same way, the BPF common unit 404 and the BPF individual unit 406b, . . . , and the BPF common unit 404 and the BPF individual unit 406g each constitute one BPF. Accordingly, the noise removing unit 402 shown in FIG. 18 is configured to include the seven BPFs. Further, the predetermined frequency band signals (detection signals) that are output from the individual BPFs are synthesized by the synthesizing unit 410, thereby configuring the frequency sampling filter that includes the seven BPFs.

Figure 19:
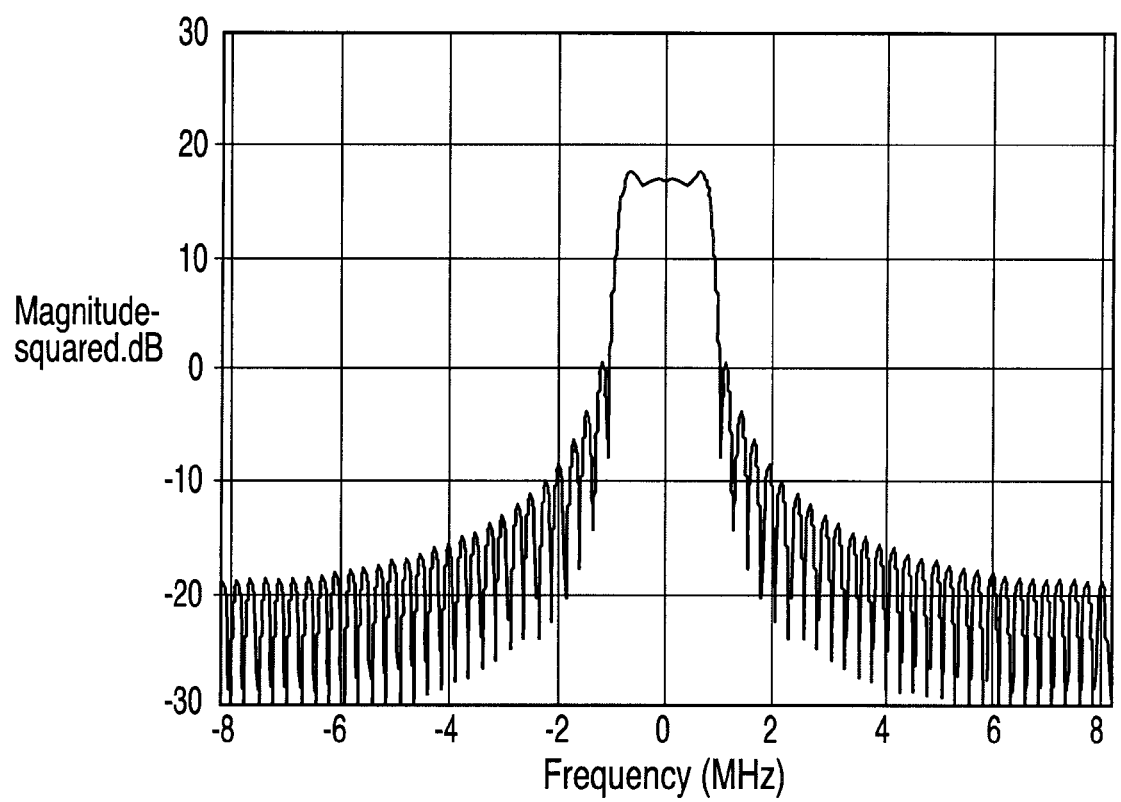
FIG. 19 is a diagram illustrating an example of an output characteristic of a frequency sampling filter that is included in a noise removing unit according to a fourth embodiment of the present invention.

FIG. 19 is a diagram illustrating an example of an output characteristic of a frequency sampling filter that is included in a noise removing unit 402 according to a fourth embodiment of the present invention. In this case, FIG. 19 shows an example of adaptive filter operation units 408a to 408g where the conditions W(f)=1, the point number Nd=64, a chip rate of a transmission signal fo=1.023 MHz, and a sampling frequency fs=16fo are set. At this time, a central frequency of each BPF that constitutes a frequency sampling filter in the noise removing unit 402 is zero, ±fs/64, ±2fs/64, or ±3fs/64, and a frequency width of a main lobe of each BPF becomes fs/64. FIG. 19 shows the case where the entire band width of the frequency sampling filter is exemplified as 7fs/64≈1.8 MHz, but the frequency sampling filter that is included in the noise removing unit 402 is not limited thereto. For example, the noise removing unit 402 can arbitrarily set a bandwidth of the frequency sampling filter depending on the point number Nd, the chip rate fo of the transmission signal, the sampling frequency fs, and the number of BPFs.

Each of the adaptive filter operation units 408a to 408g removes an external noise based on the discretization signal (detection signal) that is output from each of the BPFs whose central frequencies are different from each other. Hereinafter, the configuration of the adaptive filter that is included in the noise removing unit 404 will be described by exemplifying the adaptive filter 408a. Further, since each of the adaptive filter operation units 408b to 408g can include the same configuration as the adaptive filter operation unit 408a, the detailed description thereof will be omitted.

[Example of the Configuration of an Adaptive Filter Operation Unit 408a]

Figure 20:
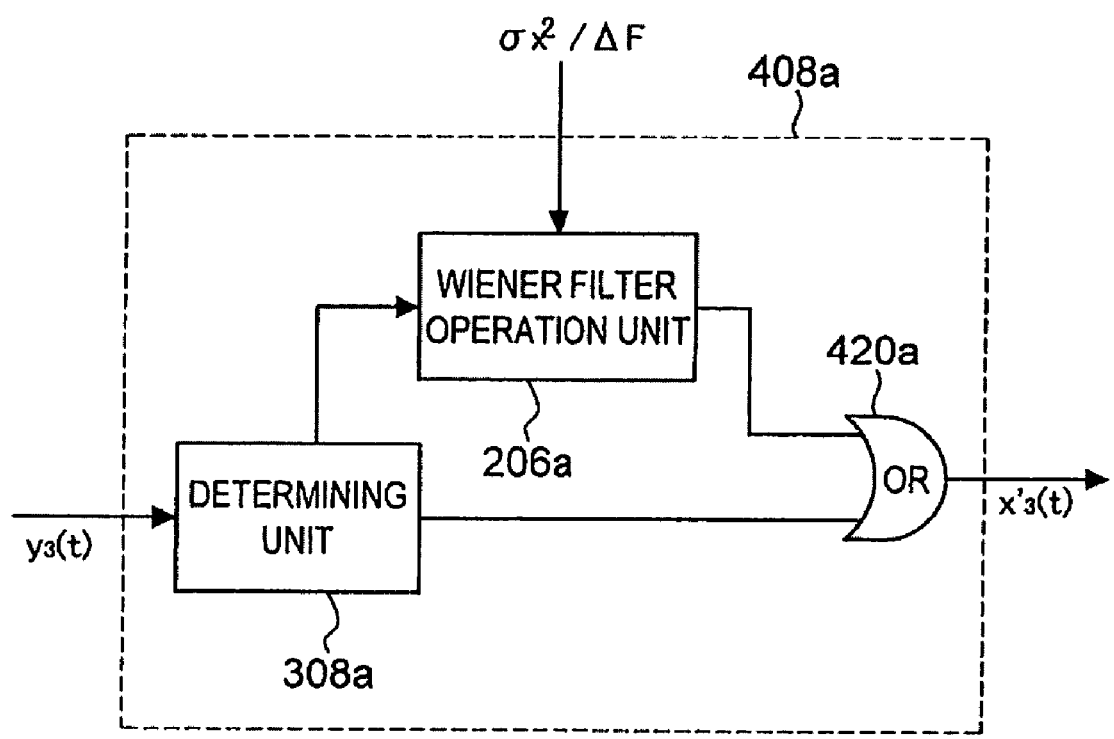
FIG. 20 is a diagram illustrating an example of the configuration of an adaptive filter that is included in a noise removing unit according to a fourth embodiment of the present invention.

FIG. 20 is a diagram illustrating an example of the configuration of an adaptive filter operation unit 408a that is included in a noise removing unit 402 according to a fourth embodiment of the present invention.

Referring to FIG. 20, the adaptive filter operation unit 408a includes a determining unit 308a (second determining unit), a Wiener filter operation unit 206a (third Wiener filter), and an OR operation unit 420a.

The determining unit 308a derives a power spectrum Py3 $(t)=y3(t)^2/N_d^2$ of a discretization signal, based on a discretization signal y3(t) that is output from the BPF individual unit 406a. In addition, the determining unit 308a compares the magnitudes of the derived power spectrum Py3(t) and the reference power Px(t)=$\sigma x^2/\Delta f$, and selectively changes an output destination of the discretization signal y3(t) in accordance with the compared result. In this case, the determining unit 308a can have the same configuration as the determining unit 308 according to the third embodiment that is shown in FIG. 15.

[1] Case of Py3(t)>Px(t)

When the magnitude of the power spectrum Py3(t) is larger than the magnitude of the reference power Px(t), this means that the external noise is included in the discretization signal y3(t). Accordingly, in the above case, the determining unit 308a outputs the discretization signal y3(t) and the power spectrum Py3(t) to the Wiener filter operation unit 206a.

[2] Case of Py3(t)≦Px(t)

When the magnitude of the power spectrum Py3(t) is smaller than or equal to the magnitude of the reference power Px(t), this means that the possibility of including the external noise in the discretization signal y3(t) is low and the level of the external noise is lower than the level of the thermal noise. As a result, the possibility of causing an issue in the demodulation of the spectrum signal is low. Accordingly, in the above case, the determining unit 308a outputs the discretization signal y3(t) to the OR operation unit 420a, not the Wiener filter operation unit 206a that removes the external noise.

When the discretization signal y3(t) and the power spectrum Py3(t) are transmitted from the determining unit 308a, the Wiener filter operation unit 206a performs an operation shown in the following Equation 10, and outputs the discretization signal x'3(t) where a mean squared error of the ideal discretization signal in the discretization signal y3(t) is minimized. In this case, the Wiener filter operation unit 206a can have the same configuration as the Wiener filter operation unit 206 according to the second embodiment that is shown in FIG. 13.

$$X'3(t)=W(t)\cdot y3(t)=y3(t)\cdot \{Px(t)/Py3(t)\}$$ [Equation 10]

When receiving the discretization signal y3(t) output from the determining unit 308a or the discretization signal x'3(t) output from the Wiener filter operation unit 206a, the OR operation unit 420a outputs the received discretization signals. In this case, the discretization signal y3(t) that is output from the determining unit 308a to the OR operation unit 420a corresponds to the discretization signal where the possibility of including the external noise is low, and the discretization signal x'3(t) output from the Wiener filter operation unit 206a corresponds to the discretization signal where the external noise is removed. Accordingly, the OR operation unit 420a outputs the same discretization signal as the ideal discretization signal in the discretization signal y3(t) or a discretization signal that includes an external noise to a degree to which the discretization signal can be regarded as the same signal as the ideal discretization signal. Further, for example, the OR operation unit 420a can be composed of an OR circuit, but the present invention is not limited thereto.

By the configuration shown in FIG. 20, for example, the adaptive filter operation unit 408a can output the discretization signal where the external noise is removed (or the external noise is not included), based on the discretization signal y3(t) that is output from the BPF individual unit 406a.

The synthesizing unit 410 synthesizes the discretization signals output from the adaptive filter operation units 408a to 408g, based on the discretization signals output from the individual BPFs. In addition, the synthesizing unit 410 can output the discretization signal x'(t) where the external noise is removed (or the external noise is not included), based on the discretization signal y(t) that is output from the A/D converter 128.

Figure 21A:
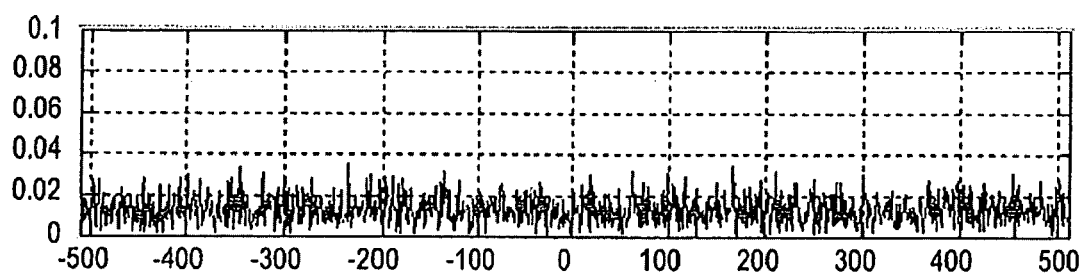
FIG. 21A is a diagram illustrating an effect of when a communication device according to a fourth embodiment of the present invention includes a noise removing unit.
Figure 21B:
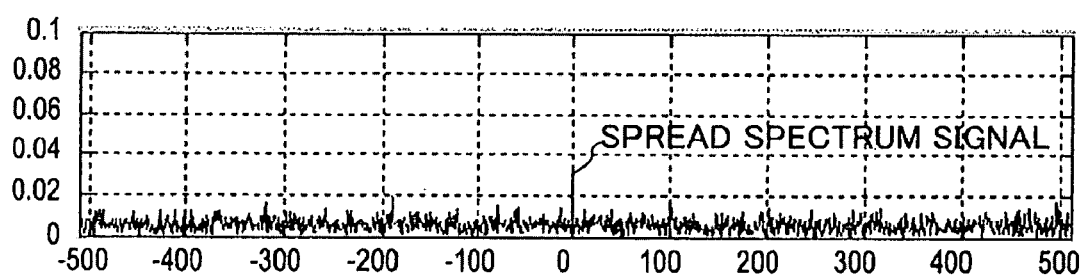
FIG. 21B is a diagram illustrating an effect of when a communication device according to a fourth embodiment of the present invention includes a noise removing unit.

FIGS. 21A and 21B are diagrams illustrating an effect of when a communication device 400 according to a fourth embodiment of the present invention includes a noise removing unit 402. FIG. 21A shows an example of a result of a de-spread process in the demodulating unit 108, when the communication device according to the embodiment of the present invention uses the frequency sampling filter that does not have the adaptive filter operation units 408a to 408g, that is, W(f)=1 is applied. FIG. 21B shows an example of a result of a de-spread process in the demodulating unit 108, when the communication device according to the embodiment of the present invention includes the noise removing unit 402, that is, the communication device uses the frequency sampling filter that includes the adaptive filter operation units 408a to 408g. FIGS. 21A and 21B show a result of a de-spread process in the demodulating unit 108 when the A/D converter 128 outputs the discretization signal y(t) indicated by the output spectrum shown in FIG. 12.

As shown in FIGS. 21A and 21B, when the communication device according to the embodiment of the present invention does not include the noise removing unit 402, that is, when the communication device uses the frequency sampling filter that does not have the adaptive filter operation units 408a to 408g, that is, when the frequency sampling filter is applied as W(f)=1, the spectrum spread signal is not detected in the demodulating unit 108 (refer to FIG. 21A). Meanwhile, when the communication device according to the embodiment of the present invention includes the noise removing unit 402, that is, the frequency sampling filter including the adaptive filter operation units 408a to 408g is used, it can be recognized that the spectrum spread signal is detected in the demodulating unit 108 (refer to FIG. 21B).

Accordingly, the noise removing unit 402 can function as an adaptive filter that can remove the broadband noise (external noise) shown in FIG. 12. The communication device 400 according to the fourth embodiment of the present invention does not remove the external noise by performing a fast Fourier transform (FFT) or an inversed fast Fourier transform (IFFT), as in the communication devices according to the second and third embodiments. However, similar to the communication devices according to the second and third embodiments, as shown in FIG. 21B, an external noise can be removed. Further, in the communication devices according to the second and third embodiments, the example of the detection result of the spectrum spread signal in the demodulating unit 108 is not shown. However, similar to the noise removing unit 402 according to the fourth embodiment, the communication devices according to the second and third embodiments use the Wiener filter operation to remove the external noise. That is, even in the communication devices according to the second and third embodiments, it is possible to obtain the same effect as FIG. 21B.

Since the communication device 400 includes, for example, the noise removing unit 402 shown in FIG. 20 to remove the external noise, the communication device 400 can detect and demodulate the spectrum spread signal, as shown in FIG. 21B.

As described above, the communication device 400 according to the fourth embodiment of the present invention basically has the same configuration as the communication device 100 according to the first embodiment shown in FIG. 6, and receives the transmission signal transmitted from the external device, detects the spectrum spread signal included in the received transmission signal, and demodulates the spectrum spread signal. Further, the communication device 400 includes the noise removing unit 402 that has a plurality of BPFs whose central frequencies are different from each other by the amount that can cover an IF signal band and performs a Wiener filter operation on each output of the BPFs. In this case, similar to the noise removing unit 202 according to the second embodiment shown in FIG. 13, the noise removing unit 402 uses the Wiener filter to remove the external noise with respect to the discretization signals output from the individual BPFs. That is, since the noise removing unit 402 does not need to perform a feedback operation on the discretization signal in order to detect the external noise, the communication device does not perform an unstable operation as in the communication device 10 according to the related art. Accordingly, the communication device 400 can stably remove the external noise from the transmission signal where the spectrum spread signal is modulated. Further, since the communication device 400 can stably remove the external noise, it is possible to surely demodulate the spectrum spread signal.

Further, similar to the communication device 100 according to the first embodiment, in the communication device 400, the A/D converter 128 that is provided at the final stage of the analog circuit to process an analog signal is composed of an A/D converter that has a resolution of N bits that are larger than the number of bits corresponding to average amplitude of a normal thermal noise. In addition, the A/D converter 128 sets the average amplitude of the normal thermal noise as lower M bits of the A/D converter 128. Accordingly, the A/D converter 128 that is included in the communication device 400 can prevent the output spectrum of the A/D converter from being saturated due to the external noise, and surely remove the external noise in the noise removing unit 402 that is provided at the rear stage of the A/D converter 128.

(Program According to a Fourth Embodiment)

The external noise can be stably removed from the transmission signal where the spectrum spread signal is modulated, by using a program that allows a computer to function as the noise removing unit 402 of the communication device 400 according to the fourth embodiment.

(Fifth Embodiment)

In the above case, as the communication device according to the first embodiment of the present invention, the description has been given to the communication device including the noise removing unit that mainly removes a single frequency noise or a narrowband noise where a noise band is narrow. Further, in the above case, as the communication devices according to the second to fourth embodiments, the description has been given to the communication devices each including the noise removing unit that function as an adaptive filter that can remove a broadband noise. However, the configuration of the noise removing unit that is included in the communication device according to the embodiment of the present invention is not limited to the configuration of the noise removing unit according to the first to fourth embodiments. For example, the communication device according to the embodiment of the present invention may include a noise removing unit having the configuration where the configuration of the noise removing unit according to the first embodiment and the configurations of the noise removing units according to the second to fourth embodiments are combined.

Hereinafter, the configuration of a communication device (hereinafter, referred to as a "communication device 500") according to a fifth embodiment of the present invention will be described. In this case, the communication device 500 and the communication devices according to the first to fourth embodiments are different from each other in the configuration of the noise removing unit, and the other configuration thereof can be the same as the configurations of the communication devices according to the first to fourth embodiments. Accordingly, in the description below, the configuration of the noise removing unit 502 of the communication device 500 is described, and the other configuration is not described.

[Example of the Configuration of a Noise Removing Unit 502]

Figure 22:
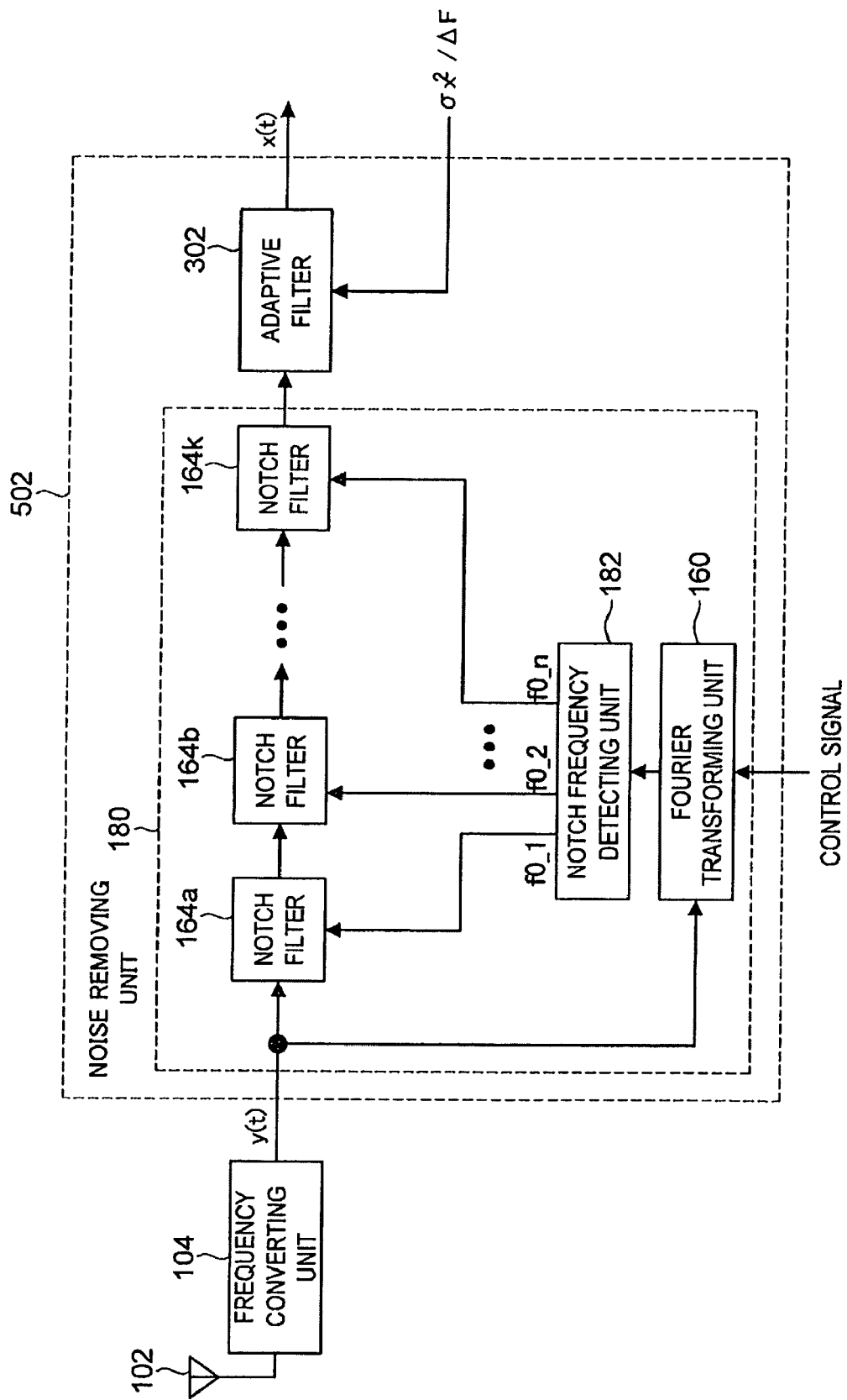
FIG. 22 is a diagram illustrating an example of the configuration of a noise removing unit according to a fifth embodiment of the present invention.

FIG. 22 is a diagram illustrating an example of the configuration of a noise removing unit 502 according to a fifth embodiment of the present invention. In FIG. 22, the communication antenna 102 and the frequency converting unit 104 are shown together. In FIG. 22, a discretization signal that has the possibility of including an external noise output from the frequency converting unit 104 is shown as a discretization signal y(t), and the discretization signal after removing the noise is shown as a discretization signal x(t). In this case, the discretization signal x(t) that is output from the noise removing unit 502 is transmitted to the demodulating unit 108.

Referring to FIG. 22, the noise removing unit 502 includes a Fourier transforming unit 160, a notch frequency detecting unit 182, k (k is an integer of two or more) notch filters 164a to 164k, and an adaptive filter operation unit 302 (first adaptive filter).

The Fourier transforming unit 160, the notch frequency detecting unit 182, and the k (k is an integer of 2 or more) notch filters 164a to 164k that are included in the noise removing unit have the same configuration as those of the noise removing unit 180 according to the modification of the first embodiment shown in FIG. 10. Accordingly, the Fourier transforming unit 160, the notch frequency detecting unit 182, and the k (k is an integer of 2 or more) notch filters 164a to 164k can mainly remove a single frequency noise or a narrowband noise where a noise band is narrow.

Further, the adaptive filter 302 has the same configuration as the noise removing unit 302 according to the third embodiment shown in FIG. 15. Accordingly, the adaptive filter 302 can remove a broadband noise.

That is, the noise removing unit 502 is configured by combining the noise removing unit 180 according to the modification of the first embodiment and the noise removing unit 302 according to the third embodiment. Accordingly, the noise removing unit 502 can remove a single frequency noise, a narrowband noise where a noise band is narrow, and a broadband noise.

Further, as described above, each of the noise removing unit 180 according to the modification of the first embodiment and the noise removing unit 302 according to the third embodiment do not need to perform a feedback operation with respect to the discretization signals in order to detect the external noise. Accordingly, the noise removing unit 502 that is configured by combining the noise removing unit 180 and the noise removing unit 302 does not perform an unstable operation even in the configuration shown in FIG. 22, as in the communication device 10 according to the related art.

Accordingly, the communication device 500 includes the noise removing unit 502, thereby stably removing the external noise from the transmission signal where the spectrum spread signal is modulated. Further, in FIG. 22, the noise removing unit according to the fifth embodiment of the present invention is configured by combining the noise removing unit 180 according to the modification of the first embodiment and the noise removing unit 302 according to the third embodiment, but is not limited to the above configuration. For example, the noise removing unit according to the fifth embodiment of the present invention can be configured by combining the noise removing unit 106 according to the first embodiment and the noise removing unit 302 according to the third embodiment, or can be configured by combining the noise removing unit 180 according to the modification of the first embodiment and the noise removing unit 402 according to the fourth embodiment.

As described above, the communication device 500 according to the fifth embodiment of the present invention basically has the same configuration as the communication device 100 according to the first embodiment shown in FIG. 6, receives the transmission signal transmitted from the external device, detects the spectrum spread signal included in the received transmission signal, and demodulates the spectrum spread signal. Further, the communication device 500 includes the noise removing unit 502 that is configured by combining the noise removing unit 180 according to the modification of the first embodiment and the noise removing unit 302 according to the third embodiment. In this case, since the noise removing unit 502 does not need to perform a feedback operation on the discretization signal in order to detect the external noise, the communication device 500 does not perform an unstable operation, as in the communication device 10 according to the related art. Accordingly, the communication device 500 can stably remove the external noise from the transmission signal where the spectrum spread signal is modulated. Further, since the communication device 500 can stably remove the external noise, the communication device 500 can surely demodulate the spectrum spread signal.

Further, similar to the communication device 100 according to the first embodiment, in the communication device 500, the A/D converter 128 that is provided at the final stage of the analog circuit to process an analog signal is composed of an A/D converter that has a resolution of N bits that are larger than the number of bits corresponding to average amplitude of a normal thermal noise. In addition, the A/D converter 128 sets the average amplitude of the normal thermal noise as lower M bits of the A/D converter 128. Accordingly, the A/D converter 128 that is included in the communication device 500 can prevent the output spectrum of the A/D converter from being saturated due to the external noise, and surely remove the external noise in the noise removing unit 502 that is provided at the rear stage of the A/D converter 128.

[Modification of a Communication Device According to a Fifth Embodiment]

In the above case, as the communication device according to the fifth embodiment of the present invention, the description has been given to the communication device 500 including the noise removing unit 502 that can remove a single frequency noise, a narrowband noise where a noise band is narrow, and a broadband noise. As described above, the noise removing unit 502 shown in FIG. 22 can be configured by combining the noise removing unit 106 according to the first embodiment and the noise removing unit 302 according to the third embodiment, thereby removing a single frequency noise, a narrowband noise where a noise band is narrow, and a broadband noise. However, the configuration of the noise removing unit that is included in the communication device according to the fifth embodiment of the present invention is not limited to the configuration of the noise removing unit shown in FIG. 22.

As an example of the broadband noise that has the possibility of being included in the discretization signal, an impulsive noise having a short persistence time is exemplified. Since the impulsive noise exists on a time base, the impulsive noise can be effectively removed by pressurizing amplitude on the time base. However, even when the amplitude on the time base is pressurized with respect to the impulsive noise, a noise spreads on a frequency axis, thus, the amplitude may be pressurized over the entire band if the noise passes through an adaptive filter for a broadband noise (for example, adaptive filter operation unit 302). For this reason, in regards to the impulsive noise, an S/N ratio of the spectrum spread signal that is detected in a de-spread process may be deteriorated due to the adaptive filter.

Accordingly, a communication device (hereinafter, referred to as "communication device 550") according to a modification of the fifth embodiment of the present invention executes the following processes of (a) and (b) to prevent the S/N ratio of the detected spectrum spread signal from being deteriorated (lost).

(a) Detection of an Impulsive Noise

In the impulsive noise, even when amplitude is large, time-averaged power is reduced. Accordingly, the communication device 550 derives an average value or an integration value in a predetermined time length, such as 1 [msec], based on the discretization signal that is output from the A/D converter 128. Next, the communication device 550 compares the derived average value or integration value and a reference value used to determine the impulsive noise. In addition, the communication device 550 determines that the impulsive noise is detected, when the derived average value or integration value becomes larger than the reference value.

(b) Control of a Filter

When it is determined that the impulsive noise is detected during the process of (a), the communication device 550 selectively turns off, for example, an adaptive filter (for example, adaptive filter 302) for a broadband noise, among the filters that constitute the noise removing unit.

The communication device 550 according to the modification of the fifth embodiment executes the processes of (a) and (b), thereby preventing the S/N ratio from being lost in the adaptive filter for the broadband noise, and reducing power consumed in the adaptive filter.

Figure 23:
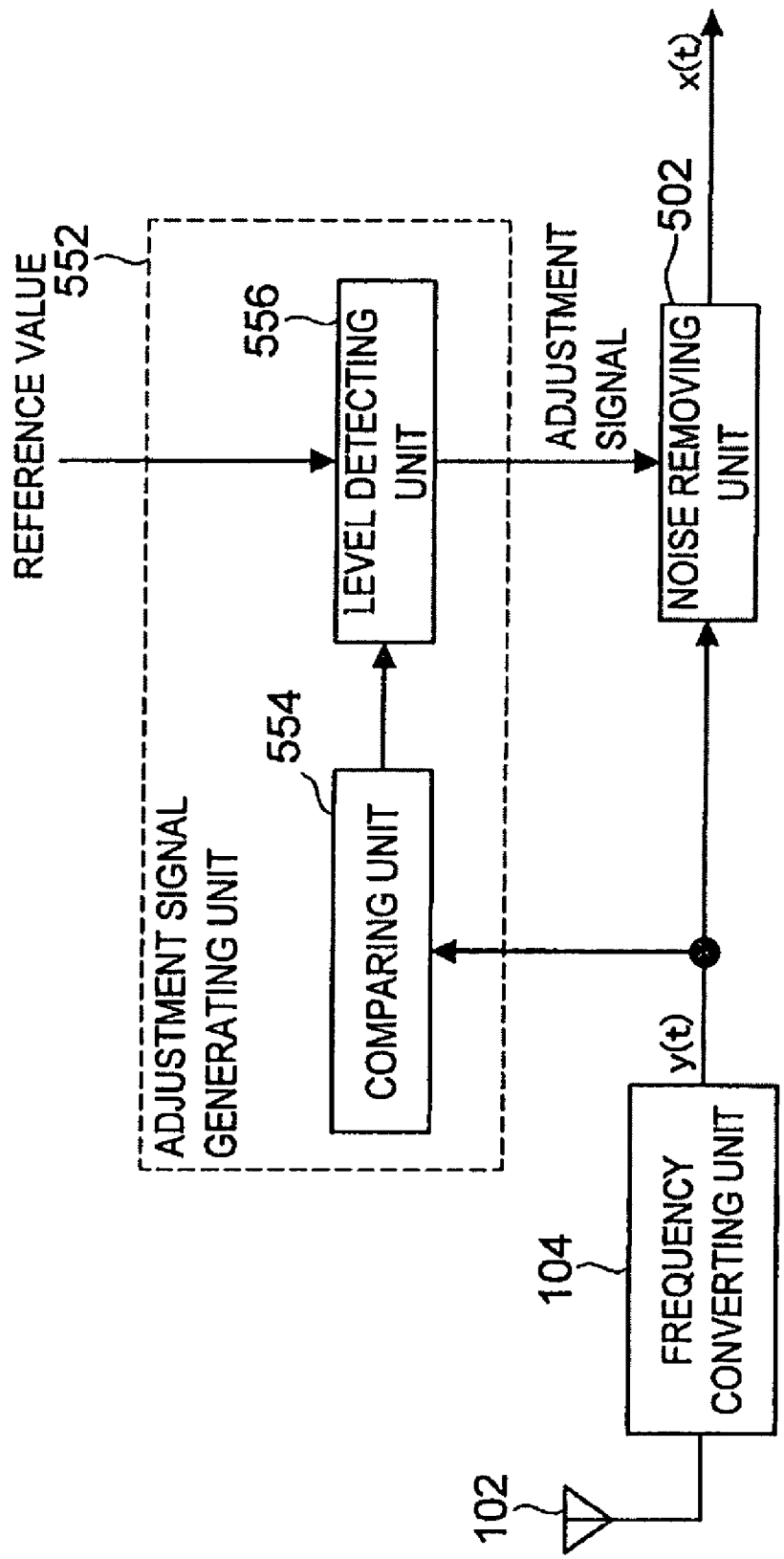
FIG. 23 is a diagram illustrating a portion of an example of the configuration of a communication device according to a modification of a fifth embodiment of the present invention.

Hereinafter, an example of the configuration of the communication device 550 according to the modification of the fifth embodiment will be described. FIG. 23 is a diagram illustrating a portion of an example of the configuration of a communication device 550 according to a modification of a fifth embodiment of the present invention. FIG. 23 shows a portion of the configuration of the communication device 550. In this case, at a rear stage of the noise removing unit 502, for example, a demodulating unit 108 that has the same configuration as the demodulating unit 108 shown in FIG. 6 is connected.

Referring to FIG. 23, the communication device 550 includes a communication antenna 102, a frequency converting unit 104, an adjustment signal generating unit 552, and a noise removing unit 502. In this case, the communication antenna 102, the frequency converting unit 104, and the noise removing unit 502 have the same configurations as those of the communication device 500 shown in FIG. 22.

The adjustment signal generating unit 552 includes a level detecting unit 554 and a comparing unit 556 (adjustment signal output unit). The level detecting unit 554 derives an average value or an integration value in a predetermined time length, based on a discretization signal that is output from the A/D converter 128. In this case, the level detecting unit 554 may be configured, for example, by using a movement average filter, an IIR (Infinite Impulse Response) filter having a predetermined time constant, such as 1 [msec], or an integration circuit by an Integrate & Dump, but the present invention is not limited thereto.

The comparing unit 556 compares the average value or the integration value in the predetermined time length output from the level detecting unit 554 and the reference value.

When the average value or the integration value is larger than the reference value, the comparing unit 556 transmits, for example, an adjustment signal, which selectively turns off the adaptive filter 302 of the noise removing unit 502, to the noise removing unit 502, and selectively turns off the adaptive filter 302. In this case, the comparing unit 556 can be composed of, for example, a comparator, but the present invention is not limited thereto. Further, the reference value is transmitted, for example, by the MPU 144 of the demodulating unit 108 or the control unit (not shown). Further, the comparing unit 556 transmits, for example, an adjustment signal that is generated with respect to a switching unit to selectively connect the discretization signal to the adaptive filter 302 or the bypass, thereby selectively turning off the adaptive filter 302, but the present invention is not limited thereto.

By the above-described configuration, the adjustment signal generating unit 552 can execute the processes of (a) and (b).

By the configuration shown in FIG. 23, for example, the communication device 550 according to the modification of the fifth embodiment can prevent the S/N ratio of the detected spectrum spread signal from being deteriorated.

Further, since the communication device 550 basically has the same configuration as the communication device 500 shown in FIG. 22, it is possible to achieve the same effect as the communication device 500 according to the fifth embodiment.

(Program According to a Fifth Embodiment)

The external noise can be stably removed from the transmission signal where the spectrum spread signal is modulated, by using a program that allows a computer to function as the noise removing unit 502 of the communication device 500 according to the fifth embodiment.

(Sixth Embodiment)

In the above case, as the communication devices according to the first to fifth embodiments of the present invention, the configuration of the communication device has been described, in which the A/D converter is included at the final stage of the frequency converting unit and has a resolution of N bits that are larger than the number of bits corresponding to average amplitude of a normal thermal noise, and the average amplitude of the normal thermal noise is set as lower M bits. By the above configuration, the communication device according to the embodiment of the present invention can prevent the output spectrum of the A/D converter from being saturated due to the external noise, and surely remove the external noise in the noise removing unit that is provided at the rear stage of the A/D converter.

Further, the communication device according to the embodiment of the present invention allows the demodulating unit to execute a de-spread process on the discretization signal where the external noise is removed in the noise removing unit, thereby demodulating the spectrum spread signal. In this case, a general GPS receiving device that communicates with a GPS satellite is composed of a one-bit or two-bit A/D converter. Therefore, for example, in the case of an ideal state where the external noise does not exist, or in the case where the level of the external noise is sufficiently lower, if the communication device includes the one-bit or two-bit A/D converter, the communication device can demodulate a GPS signal. That is, since the communication device according to the embodiment of the present invention allows the noise removing unit to remove the external noise, the M-bit (for example, 3 bits or more) discretization signal is not necessarily needed, in the demodulating unit that is provided at the rear stage of the noise removing unit.

Accordingly, the communication device according to the sixth embodiment of the present invention reduces the number of bits with respect to the discretization signal where the external noise is removed in the noise removing unit. By reducing the number of bits with respect to the discretization signal where the external noise is removed, the communication device according to the sixth embodiment of the present invention can reduce the sizes of an operator or a register and a memory that constitute the demodulating unit. Further, in the case where a function of reducing the number of bits is added to the communication device 550 according to the modification of the fifth embodiment shown in FIG. 23, even when the communication device according to the embodiment of the present invention selectively turns off, for example, the adaptive filter 302 by the bypass, the communication device can reduce the number of bits to suppress amplitude of an impulsive noise that is included in the discretization signal. Accordingly, even in the above case, the communication device according to the embodiment of the present invention can surely demodulate the spectrum spread signal.

Figure 24:
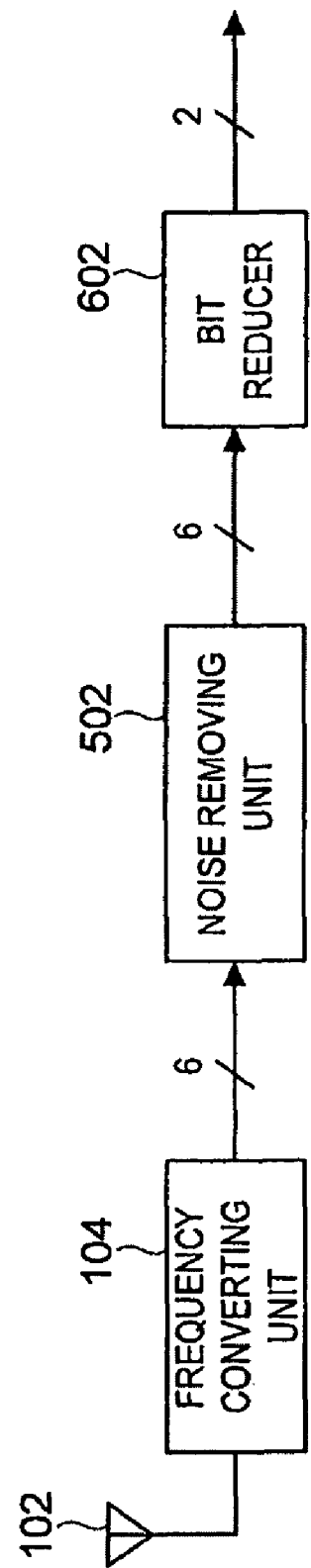
FIG. 24 is a diagram illustrating a portion of an example of the configuration of a communication device according to a sixth embodiment of the present invention.

Hereinafter, an example of the configuration of the communication device according to the sixth embodiment of the present invention will be described. FIG. 24 is a diagram illustrating a portion of an example of the configuration of a communication device (hereinafter, referred to as "communication device 600") according to a sixth embodiment of the present invention. FIG. 24 shows a portion of the configuration of the communication device 600. In this case, the demodulating unit 108 that has the same configuration as the demodulating unit 108 shown in FIG. 6 is connected, for example, at a rear stage of the noise removing unit 502.

Referring to FIG. 24, the communication device 600 includes a communication antenna 102, a frequency converting unit 104, a noise removing unit 502, and a bit reducer 602 (bit number setting unit). In this case, the communication antenna 102, the frequency converting unit 104, and the noise removing unit 502 have the same configurations as those of the communication device 500 shown in FIG. 22. FIG. 24 shows an example of when a 6-bit discretization signal is output from the A/D converter 128 of the frequency converting unit 104.

The bit reducer 602 outputs, for example, a signal where an upper limit is restricted with respect as lower P bits (P is an integer where N>P) of the discretization signal, based on the discretization signal output from the noise removing unit 502, thereby reducing the number of bits of the discretization signal. FIG. 24 shows an example of when the bit reducer 602 reduces the number of bits of the discretization signal from the discretization signal of 6 bits to the discretization signal of 2 bits. Further, a method of reducing the number of bits in the bit reducer 602 according to the sixth embodiment of the present invention is not limited to the above example.

By the configuration shown in FIG. 24, for example, the communication device 600 according to the sixth embodiment can reduce the number of bits with respect to the discretization signal where the external noise is removed in the noise removing unit.

Further, since the communication device 600 basically has the same configuration as the communication device 500 shown in FIG. 22, it is possible to achieve the same effect as the communication device 500 according to the fifth embodiment. In FIG. 24, as the communication device according to the sixth embodiment, the communication device 600 having the configuration where the bit reducer 602 is added to the communication device 500 shown in FIG. 22 is exemplified, but the present invention is not limited thereto. For example, the communication device according to the sixth embodiment of the present invention can be configured by additionally providing the bit reducer 602 at the rear stage of the noise removing unit, with respect to the communication devices according to the first to fourth embodiments.

(Seventh Embodiment)

Since the notch filter or the Wiener filter that the communication device according to the first to sixth embodiments includes as the noise removing unit is a digital filter, in the noise removing units according to the first to sixth embodiments, a large ratio between a sampling frequency of filter processing and a carrier frequency is effective in terms of processing. Further, when an intermediate frequency of an IF signal is not zero, the number of A/D converts that are included in the frequency converting unit is one. Thus, an intermediate frequency (IF) is generally set as several MHz in the GPS receiving device or the like.

Accordingly, the communication device according to the seventh embodiment of the present invention allows the frequency converting unit to convert a transmission signal into an IF signal having a predetermined frequency other than zero. Next, the communication device according to the seventh embodiment further converts the discretization signal, which is output from the A/D converter and has a predetermined frequency, into the discretization signal having a zero frequency. In addition, the communication device according to the seventh embodiment removes an external noise from the discretization signal where a frequency is zero, and demodulates a spectrum spread signal.

Accordingly, the communication device according to the seventh embodiment of the present invention can configure the frequency converting unit to include one A/D converter. Further, it is possible to improve easiness of a process of removing an external noise in the noise removing unit. Hereinafter, an example of the configuration of the communication device according to the seventh embodiment will be described.

Figure 25:
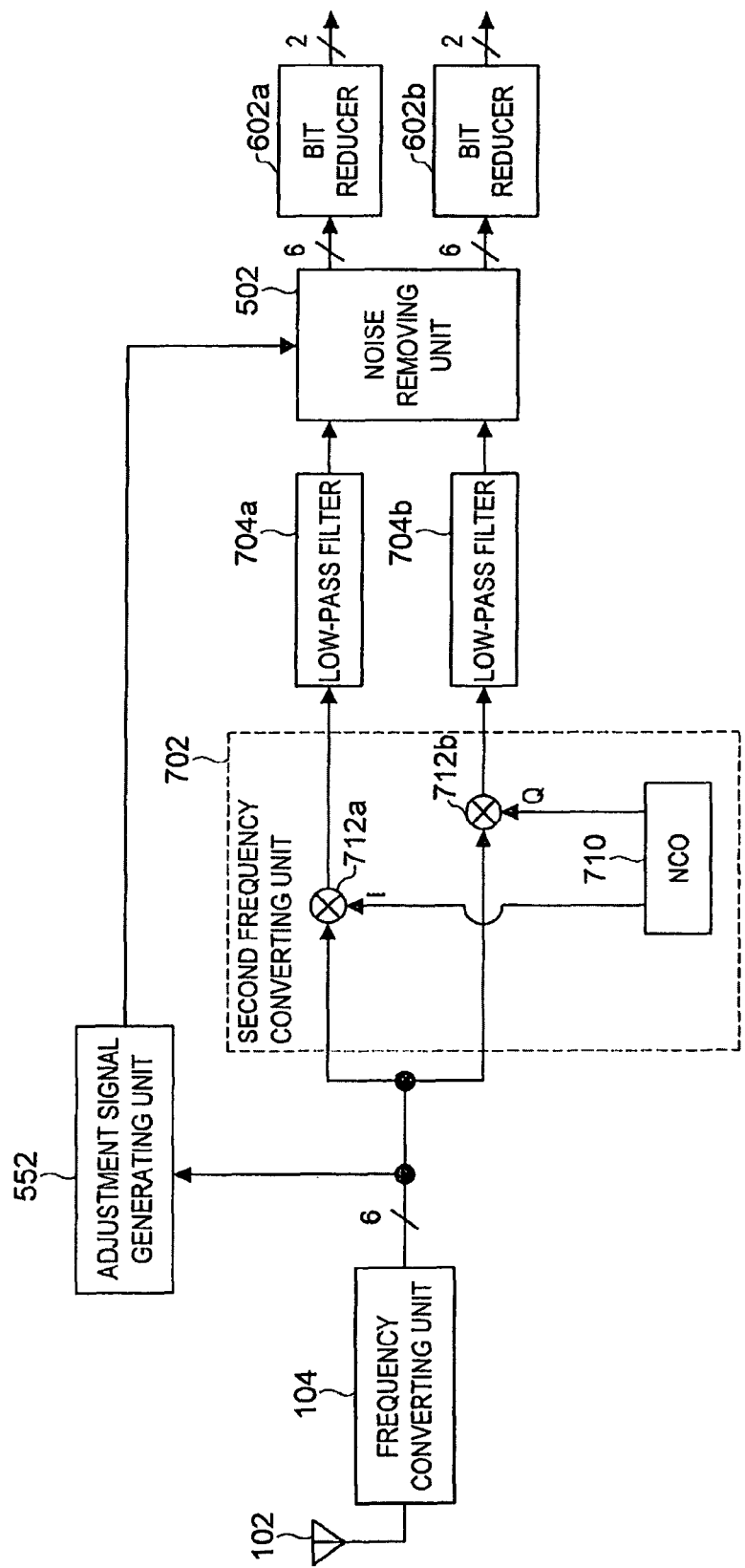
FIG. 25 is a diagram illustrating a portion of an example of the configuration of a communication device according to a seventh embodiment of the present invention.

FIG. 25 is a diagram illustrating a portion of an example of the configuration of a communication device 700 according to a seventh embodiment of the present invention. FIG. 25 shows a portion of the configuration of the communication device 550. In this case, at a rear stage of the bit reducer 602a and the bit reducer 602b, for example, the demodulating unit 108 that has the same configuration as the demodulating unit 108 shown in FIG. 6 is connected.

Referring to FIG. 25, the communication device 700 includes a communication antenna 102, a frequency converting unit 104, an adjustment signal generating unit 552, a second frequency converting unit 702 (frequency converting unit), a low-pass filter 704a, a low-pass filter 704b, a noise removing unit 502, a bit reducer 602a, and a bit reducer 602b. In this case, the communication antenna 102, the frequency converting unit 104, the adjustment signal generating unit 552, and the noise removing unit 502 have the same configurations as those of the communication device 550 shown in FIG. 23. Further, the bit reducer 602a and the bit reducer 602b have the same configurations as those of the communication device 600 shown in FIG. 24. Further, it is assumed that the intermediate frequency converted by the frequency converting unit 104 is, for example, a frequency other than zero, such as 4.092 MHz or 1.023 MHz.

The second frequency converting unit 702 includes an NCO (Numeric Controlled Oscillator) 710, a multiplier 712a, and a multiplier 712b.

The multiplier 712a multiplies the discretization signal output from the A/D converter 128 and a sine component of an oscillation signal transmitted from the NCO 710. Further, the multiplier 712b multiplies the discretization signal output from the A/D converter 128 and the cosine component of the oscillation signal transmitted from the NCO 710. In this case, the NCO 710 generates an oscillation signal whose frequency corresponds to an intermediate frequency. For example, when the frequency (that is, intermediate frequency) of the discretization signal that is output from the A/D converter 128 is 4.092 MHz, the NCO 710 generates an oscillation signal of 4.092 MHz.

By the above configuration, the second frequency converting unit 702 can convert the discretization signal of the frequency other than zero into a discretization signal whose frequency is zero. Further, the configuration of the second frequency converting unit 702 is not limited to the above example.

The low-pass filter 704a attenuates a signal having a frequency that is higher than a cutoff frequency, based on the discretization signal output from the multiplier 712a, and in the same way, the low-pass filter 704b attenuates a signal having a frequency that is higher than a cutoff frequency, based on the discretization signal output from the multiplier 712b. In addition, the low-pass filter 704a and the low-pass filter 704b output the discretization signals output from the multiplier 712a and the multiplier 712b to the noise removing unit 502.

The noise removing unit 502 processes the discretization signal where a frequency is converted into zero in the second frequency converting unit 702.

By the configuration shown in FIG. 25, for example, the communication device 700 can improve easiness of a process of removing the external noise in the noise removing unit. Further, since the communication device 700 has the same configuration as the communication device 550 shown in FIG. 23, it is possible to achieve the same effect as the communication device 550 according to the modification of the fifth embodiment.

The communication devices 100 to 700 according to the embodiments of the present invention have been described, but the embodiments of the present invention are not limited thereto. For example, the present invention can be applied to a computer, such as an UMPC (Ultra Mobile Personal Computer), a portable communication device, such as a mobile phone, a portable game machine, such as a PlayStation Portable (registered trademark), a navigation device, such as car navigation, and an imaging device, such as a digital still camera.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device, comprising:
   a communication antenna that receives a transmission signal where a spectrum spread signal subjected to a spectrum spread is modulated;
   an intermediate frequency converting unit that converts the transmission signal received by the communication antenna into an intermediate frequency signal having a predetermined frequency;
   an analog to digital converting unit that discretizes the intermediate frequency signal and outputs a discretization signal;
   a noise removing unit that detects a noise other than a normal thermal noise included in the discretization signal and removes the detected noise from the discretization signal;
   wherein the noise removing unit includes:
      a Fourier transforming unit that performs a fast Fourier transform on the discretization signal;
      a frequency detecting unit that detects a frequency whose amplitude is a predetermined value or more as a peak frequency of the noise, based on a result of the fast Fourier transform in the Fourier transforming unit;
      a notch filter that sets the peak frequency detected in the frequency detecting unit as a notch frequency, and outputs a discretization signal where a frequency component corresponding to the set notch frequency is attenuated based on the discretization signal; and
      an adaptive filter that outputs a discretization signal that minimizes a mean squared error with respect to an ideal discretization signal in an ideal state not including the noise;
   a demodulating unit that demodulates the spectrum spread signal, based on the discretization signal that is output from the noise removing unit;
   a level detecting unit that detects an average value or an integration value in a predetermined time of the discretization signal; and
   an adjustment signal output unit that outputs an adjustment signal to selectively operate the notch filter and the adaptive filter, based on the average value or the integration value detected by the level detecting unit and a predetermined threshold value.

2. The communication device according to claim 1, wherein the noise removing unit further includes a plurality of notch filters, and
   in the notch filters, the peak frequencies that are detected by the frequency detecting unit are set in the order of the peak frequencies having large amplitude.

3. The communication device according to claim 1, wherein the frequency detecting unit periodically or randomly performs a fast Fourier transform on the discretization signal, and
   the notch filter sets the notch frequency, when the peak frequency is detected in the frequency detecting unit.

4. The communication device according to claim 1, wherein the noise removing unit detects the noise other than the normal thermal noise included in the discretization signal without performing a feedback operation on the discretization signal.

5. The communication device according to claim 1, further comprising a frequency converting unit that converts a signal into a discretization signal where a central frequency of the discretization signal output from the analog to digital converting unit is set as zero, wherein the intermediate frequency converting unit sets the predetermined frequency as a frequency other than zero, and the noise removing unit receives the discretization signal that is output from the frequency converting unit.

6. A communication device, comprising:
   a communication antenna that receives a transmission signal where a spectrum spread signal subjected to a spectrum spread is modulated;
   an intermediate frequency converting unit that converts the transmission signal received by the communication antenna into an intermediate frequency signal having a predetermined frequency;
   an analog to digital converting unit that discretizes the intermediate frequency signal and outputs a discretization signal;

a noise removing unit that detects a noise other than a normal thermal noise included in the discretization signal and removes the detected noise from the discretization signal; and a demodulating unit that demodulates the spectrum spread signal, based on the discretization signal that is output from the noise removing unit;

wherein the noise removing unit includes:
- a Fourier transforming unit that performs a fast Fourier transform on the discretization signal and derives a power spectrum based on a result of the fast Fourier transform; and
- a Wiener filter that outputs a discretization signal that minimizes a mean squared error with respect to an ideal discretization signal in an ideal state not including the noise, based on the discretization signal, the power spectrum output from the Fourier transforming unit, and reference power per unit frequency.

7. A communication device, comprising:

a communication antenna that receives a transmission signal where a spectrum spread signal subjected to a spectrum spread is modulated;

an intermediate frequency converting unit that converts the transmission signal received by the communication antenna into an intermediate frequency signal having a predetermined frequency;

an analog to digital converting unit that discretizes the intermediate frequency signal and outputs a discretization signal;

a noise removing unit that detects a noise other than a normal thermal noise included in the discretization signal and removes the detected noise from the discretization signal; and a demodulating unit that demodulates the spectrum spread signal, based on the discretization signal that is output from the noise removing unit;

wherein the noise removing unit includes:
- a Fourier transforming unit that performs a fast Fourier transform on the discretization signal;
- a first determining unit that selectively outputs a result of the fast Fourier transform in the Fourier transforming unit or a power spectrum derived from the result of the fast Fourier transform, based on the result of the fast Fourier transform and the power spectrum;
- a Wiener filter that outputs a discretization signal that minimizes a mean squared error with respect to an ideal discretization signal in an ideal state not including the noise, based on the power spectrum and reference power per unit frequency, when the power spectrum is output from the first determining unit; and
- an inversed Fourier transforming unit that performs an inversed fast Fourier transform on the result of the fast Fourier transform output from the first determining unit or the discretization signal output from the Wiener filter.

8. A communication device, comprising:

a communication antenna that receives a transmission signal where a spectrum spread signal subjected to a spectrum spread is modulated;

an intermediate frequency converting unit that converts the transmission signal received by the communication antenna into an intermediate frequency signal having a predetermined frequency;

an analog to digital converting unit that discretizes the intermediate frequency signal and outputs a discretization signal;

a noise removing unit that detects a noise other than a normal thermal noise included in the discretization signal and removes the detected noise from the discretization signal; and a demodulating unit that demodulates the spectrum spread signal, based on the discretization signal that is output from the noise removing unit;

wherein the noise removing unit includes:
- a plurality of band-pass filters each of which detects a predetermined frequency band detection signal from the discretization signal;
- a plurality of adaptive filters that correspond to the band-pass filters, and selectively output the detection signal or a discretization signal that minimizes a mean squared error with respect to an ideal discretization signal in an ideal state not including the noise; and
- a synthesizing unit that synthesizes the discretization signals output from the adaptive filters, each of the adaptive filters includes a determining unit that selectively outputs the detection signal or a power spectrum derived from the detection signal, based on the power spectrum; and
- a Wiener filter that outputs a discretization signal that minimizes a mean squared error with respect to the ideal discretization signal, based on the power spectrum and reference power per unit frequency, when the power spectrum is output from the second determining unit.

9. A communication device, comprising:

a communication antenna that receives a transmission signal where a spectrum spread signal subjected to a spectrum spread is modulated;

an intermediate frequency converting unit that converts the transmission signal received by the communication antenna into an intermediate frequency signal having a predetermined frequency;

an analog to digital converting unit that discretizes the intermediate frequency signal and outputs a discretization signal;

a noise removing unit that detects a noise other than a normal thermal noise included in the discretization signal and removes the detected noise from the discretization signal; and a demodulating unit that demodulates the spectrum spread signal, based on the discretization signal that is output from the noise removing unit;

wherein the analog to digital converting unit includes an analog to digital converter that has a resolution of N bits (N is an integer) larger than the number of bits corresponding to average amplitude of the normal thermal noise, and converts an input analog signal into a digital signal, and the analog to digital converter sets the average amplitude of the normal thermal noise as lower M bits (M is an integer where $N > \cdot M$).

10. The communication device according to claim 9, further comprising a bit number determining unit that sets the number of bits of the discretization signal output from the noise removing unit as P bits (P is an integer where $N > \cdot P$).

* * * * *